US010836637B2

(12) United States Patent
Forbes et al.

(10) Patent No.: US 10,836,637 B2
(45) Date of Patent: Nov. 17, 2020

(54) CONTACTOR APPARATUS AND METHOD OF USE

(71) Applicant: CONTROLS SOUTHEAST, INC., Pineville, NC (US)

(72) Inventors: Brandon W. Forbes, Fort Mill, SC (US); Thomas C. Willingham, Weddington, NC (US)

(73) Assignee: CONTROLS SOUTHEAST, INC., Pineville, NC (US)

( * ) Notice: Subject to any disclaimer, the term of this patent is extended or adjusted under 35 U.S.C. 154(b) by 0 days.

(21) Appl. No.: 16/525,042

(22) Filed: Jul. 29, 2019

(65) Prior Publication Data

US 2020/0039824 A1    Feb. 6, 2020

Related U.S. Application Data

(60) Provisional application No. 62/712,705, filed on Jul. 31, 2018.

(51) Int. Cl.
  *C01B 17/02*    (2006.01)
  *B01D 19/00*    (2006.01)

(52) U.S. Cl.
  CPC ...... *C01B 17/0232* (2013.01); *B01D 19/0005* (2013.01); *C01P 2006/80* (2013.01)

(58) Field of Classification Search
  CPC ...... C01B 17/02; C01B 17/0232; B01J 19/24; B01J 2208/00; B01J 2219/24
  See application file for complete search history.

(56) References Cited

U.S. PATENT DOCUMENTS 2,300,849 A * 11/1942 Tauch ................. C01B 17/0232
                                                         210/769
4,478,811 A    10/1984 Hass
RE32,009 E    10/1985 Ledford et al.
4,612,020 A     9/1986 Fischer et al.
                (Continued)

FOREIGN PATENT DOCUMENTS

WO    2013006040 A1    1/2013
WO    2013044104 A1    3/2013

OTHER PUBLICATIONS

International Search Report and Written Opinion for International Application No. PCT/US2015/060665 dated Feb. 22, 2016.
(Continued)

*Primary Examiner* — Timothy C Vanoy
(74) *Attorney, Agent, or Firm* — Moore & Van Allen PLLC; Jeffrey R. Gray

(57) ABSTRACT

Embodiments of the invention are directed to a contactor apparatus for degassing liquid sulfur, in order to separate the liquid sulfur from the process vapors. As such, the liquid sulfur is at least partially degassed to reduce off-gassing of dangerous gases during storage and transportation without the need for additional equipment to degas the liquid sulfur during or after storage. The contactor apparatus may receive liquid sulfur and degassing gas, which are passed through a catalyst zone, which along with the degassing gas degasses the liquid sulfur. The contactor apparatus is structured such that a catalyst within the catalyst zone is constrained within and prevented from flowing out, while still allowing the flow of liquid sulfur and degassing gas.

20 Claims, 11 Drawing Sheets

(56) References Cited

U.S. PATENT DOCUMENTS

| | | |
|---|---|---|
| 4,729,887 A | 3/1988 | Pendergraft |
| 4,755,372 A | 7/1988 | Baker |
| 4,764,192 A | 8/1988 | Heisel et al. |
| 4,880,606 A | 11/1989 | Gorlich |
| 5,080,695 A | 1/1992 | Kassarjian |
| 5,632,967 A | 5/1997 | Nasato |
| 5,935,548 A | 8/1999 | Franklin et al. |
| 6,149,887 A | 11/2000 | Lagas et al. |
| 7,081,233 B2 | 7/2006 | Louie |
| 7,927,577 B2 | 4/2011 | Rameshni et al. |
| 8,084,013 B2 | 12/2011 | Tonjes et al. |
| 8,679,448 B2 | 3/2014 | Chow et al. |
| 8,871,176 B2 | 10/2014 | Liu et al. |
| 9,138,675 B2 | 9/2015 | Keller |
| 9,260,307 B2 | 2/2016 | Borsboom et al. |
| 2010/0178236 A1 | 7/2010 | Rameshni et al. |
| 2013/0071315 A1 | 3/2013 | Chow et al. |
| 2013/0247763 A1 | 9/2013 | Forbes et al. |
| 2014/0065057 A1 | 3/2014 | Metheral et al. |
| 2014/0079614 A1 | 3/2014 | Liu et al. |
| 2014/0366731 A1 | 12/2014 | Nougayrede et al. |
| 2014/0374069 A1 | 12/2014 | Keller |
| 2014/0374070 A1 | 12/2014 | Keller |
| 2014/0377155 A1 | 12/2014 | Keller |
| 2014/0377164 A1 | 12/2014 | Keller |
| 2014/0377165 A1* | 12/2014 | Keller .................. B01D 5/0012 423/574.2 |
| 2015/0376007 A1* | 12/2015 | Keller .................. C01B 17/0456 423/574.1 |
| 2015/0376008 A1* | 12/2015 | Keller .................. B01D 5/0012 423/574.1 |
| 2018/0179061 A1 | 6/2018 | Groves et al. |

OTHER PUBLICATIONS

International Preliminary Report on Patentability for International Application No. PCT/US2015/060665 dated May 16, 2017.

International Search Report and Written Opinion for International Patent Application No. PCT/US19/44138 completed Nov. 14, 2019.

* cited by examiner

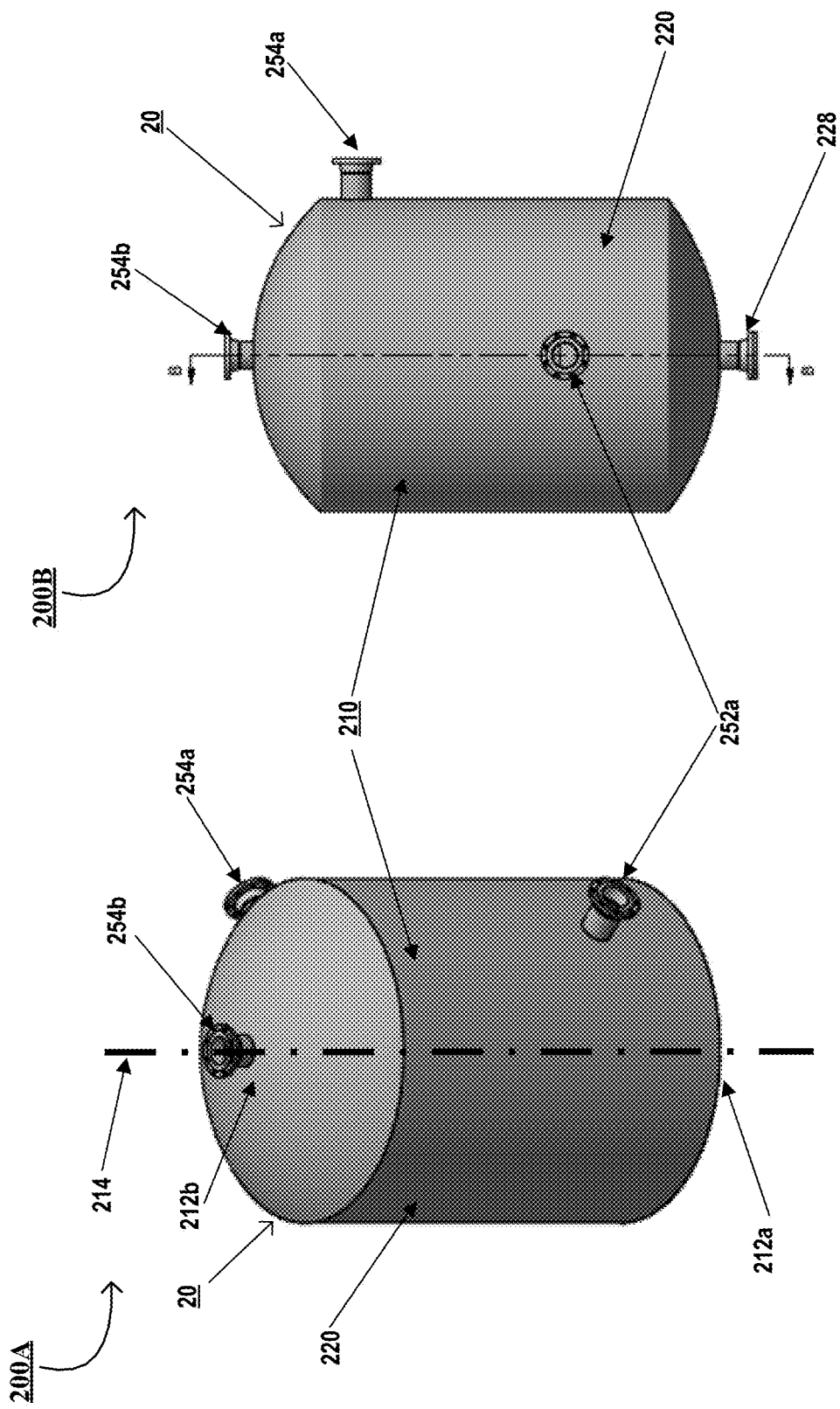

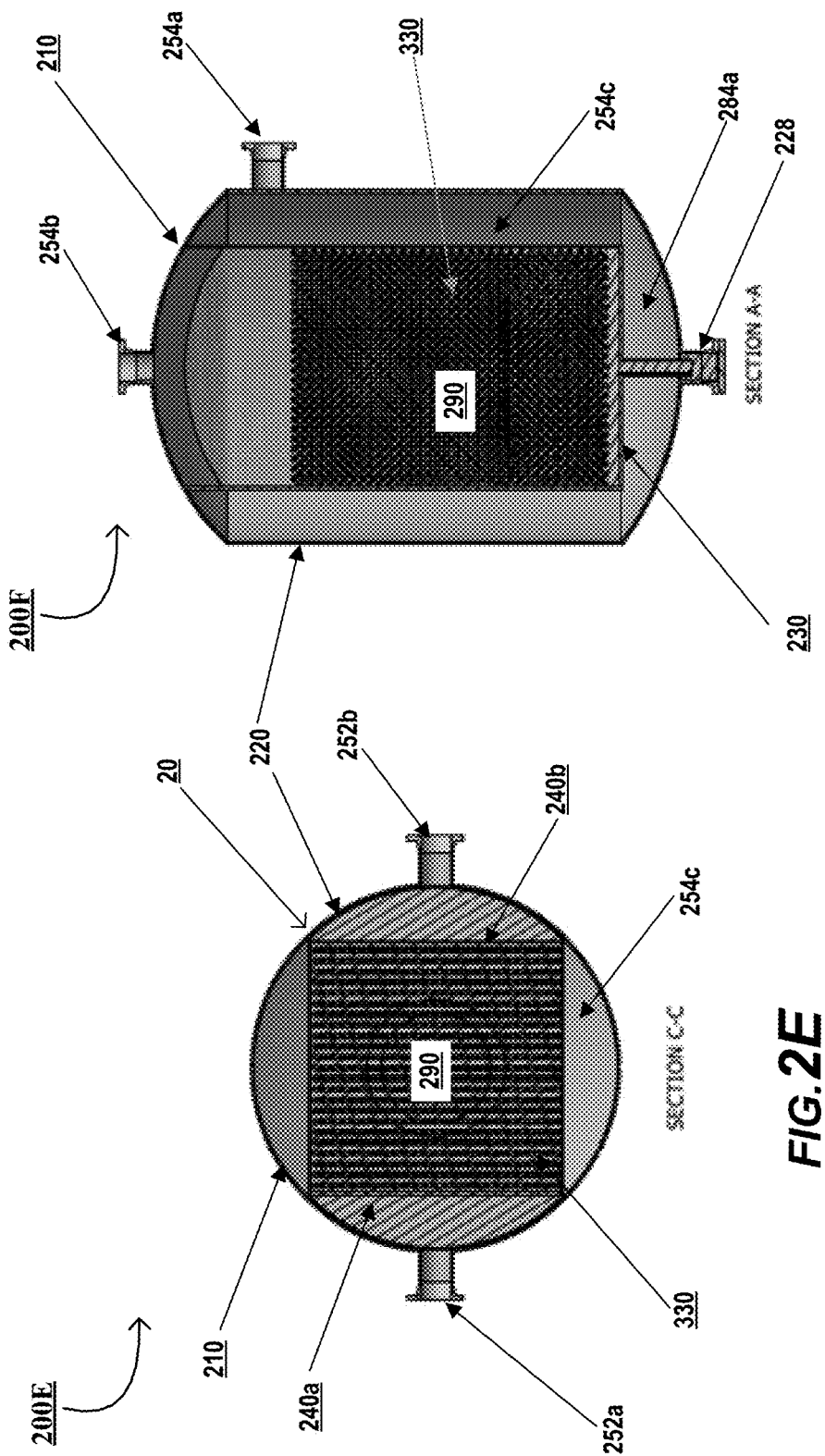

CONTACTOR APPARATUS AND METHOD OF USE

CROSS REFERENCE AND PRIORITY CLAIM UNDER 35 U.S.C. § 119

The present Application for a Patent claims priority to U.S. Provisional Patent Application Ser. No. 62/712,705 entitled "CONTACTOR APPARATUS AND METHOD OF USE" filed on Jul. 31, 2018 and assigned to the assignees hereof and hereby expressly incorporated by reference herein.

FIELD

This application relates generally to the field of sulfur recovery systems and devices within sulfur recovery systems for degassing liquid sulfur, and more particularly to a device for capturing liquid sulfur, separating liquid sulfur from process vapors, and removing mechanically and chemically bound Hydrogen Sulfide ("$H_2S$") from the liquid sulfur before storing the liquid sulfur.

BACKGROUND

Sulfur recovery systems are used in a variety of industrial applications for recovering sulfur. Initially, elemental sulfur is recovered from gaseous compounds that are typically produced as by-products from refining crude oil and other industrial processes. The process of recovering elemental sulfur from gaseous compounds is a multi-step process, wherein the gaseous compounds are processed to remove sulfur, typically in the form of hydrogen sulfide. To convert the gaseous hydrogen sulfide to liquid sulfur, a series of sulfur condensers are utilized to lower the process vapor below the dew point of the sulfur. After the condenser, sulfur recovery units typically utilize sulfur traps to separate liquid sulfur from the remaining process vapors.

The Claus process is one gas desulfurizing process for recovering elemental sulfur from gaseous hydrogen sulfide. It was first developed in the 1880's and has become an industry standard for refineries, chemical plants and natural gas processing plants. As petroleum and natural gas is tending to contain ever increasing amounts of sulfur compounds while fuel regulations are tending to mandate less allowable sulfur in fuel, Claus processes become increasingly important.

A Claus plant, which is a multi-step process within a larger industrial plant is arranged to recover sulfur from gaseous hydrogen sulfide. Typically, elemental sulfur is produced by a thermal step and several catalytic steps. Elemental sulfur is separated from the Claus plant as a liquid at one or more condensers, however, some process vapor may remain or naturally off-gas from the liquid sulfur.

These process vapors from the process may still contain sulfur components, such as hydrogen sulfide, carbonyl sulfide, carbon disulfide, and the like. As such, the process vapors may either be burned in an incineration unit or are further desulfurized in a sulfur recovery system. The process vapors are separated from the liquid sulfur through sulfur sealing devices (e.g., otherwise described as a sulfur trap, a sulfur seal, or sulfur sealing, device, system, or apparatus).

While current sulfur condensers have proven satisfactory for condensing sulfur, there is a need for improvement in the quality of the sulfur condensed. The problem is that the condensed sulfur includes dissolved $H_2S$. It has been found that it is the nature of a liquid sulfur produced in a sulfur condenser process that reactant hydrogen sulfide ($H_2S$) is incorporated into the liquid sulfur as simple dissolved $H_2S$ and also as chemically bound with sulfur in the form what is sometimes called a sulfane or polysulfane. Sulfane is $H_2Sx$, (with x>1). $H_2Sx$ is formed at high temperatures (e.g. 318° Fahrenheit and above) and is also chemically bound to sulfur and cannot be mechanically removed. $H_2Sx$ will convert back to $H_2S$ and elemental sulfur in time through a slow equilibrium reaction. The reaction is slow because the $H_2Sx$ has a half-life of 500 minutes. As such, over an extended time, the $H_2S$ will eventually disassociate from the liquid sulfur and accumulate as a toxic and flammable gas in vapor spaces at the top of storage or transport vessels in which the liquid sulfur is located. In some instances, up to half of the reported emissions from a Claus sulfur recovery plant and Claus Tail Gas Cleanup unit can come from $H_2S$ emanating from liquid sulfur in storage. Since an unsafe condition is possible until the sulfur is mostly or fully degassed of dissolved $H_2S$, precautionary steps are required prior to opening a sulfur vessel and while transferring liquid sulfur from one vessel to another.

Degassing liquid sulfur requires the removal of hydrogen sulfide (e.g. $H_2S$ and $H_2Sx$). Degassing is best achieved through agitation and catalyst. Thorough degassing is imperative before storing the $H_2S$ because capturing and disposing of $H_2S$ that is emanating from liquid sulfur storage provides other issues. Without degassing operations or adequate capture and disposal technology, these additional emissions may limit the sulfur processing capability of the Claus/TGU (Tail Gas Unit) unit.

BRIEF SUMMARY

Embodiments of the invention are directed to a contactor apparatus and methods for degassing liquid sulfur using the contactor apparatus. In some embodiments, the contactor apparatus comprises a catalyst zone for degassing liquid sulfur. In some embodiments, the contactor apparatus is structured for degassing the liquid sulfur such that liquid sulfur is directed through the catalyst zone in a transverse crosswise direction (e.g., a generally horizontal direction) while a degassing gas is directed through the catalyst zone in an upward direction, perpendicular to the transverse direction (e.g., a generally vertical direction). The contactor apparatus is structured such that a catalyst, structured catalyst or pellet catalyst (e.g., a plurality of beads, balls, and/or other like granular masses), within the catalyst zone is constrained within and prevented from flowing out, while still allowing the flow of liquid sulfur and degassing gas in the manner described above. As such, the liquid sulfur is at least partially degassed to reduce off-gassing of dangerous gases during storage and transportation without the need for additional equipment to degas the liquid sulfur during or after storage.

Embodiments of the invention comprise contactor apparatus for degassing liquid sulfur. The apparatus comprises a housing comprising a liquid sulfur inlet, a liquid sulfur outlet, a degassing gas inlet, and a degassing gas outlet. The apparatus further comprises a degassing assembly located within the housing having a sparge assembly operatively coupled to the degassing gas inlet and a sulfur control assembly. The sulfur control assembly comprises a sulfur inlet control assembly operatively coupled to the liquid sulfur inlet, and a sulfur outlet control assembly operatively coupled to the liquid sulfur outlet. The sparge assembly and the sulfur control assembly form a catalyst zone for degassing the liquid sulfur. The liquid sulfur received at the liquid sulfur inlet is passed through the sulfur inlet control assembly and passed into the catalyst zone in a generally horizontal direction, and the liquid sulfur exits the catalyst zone through the sulfur outlet control assembly and exits the housing at the liquid sulfur outlet. Additionally, the housing receives degassing gas at the degassing gas inlet, and the degassing gas is passed through the catalyst zone in a generally vertical direction, and the degassing gas exits the housing at the degassing gas outlet.

In further accord with embodiment of the invention, the sulfur inlet control assembly and a portion of the housing form a sulfur inlet zone that is configured to produce a uniform liquid sulfur pressure distribution across the sulfur control assembly, and the sulfur outlet control assembly and a portion of the housing form a sulfur outlet zone that is configured to produce the uniform liquid sulfur pressure distribution across the sulfur control assembly. Moreover, the sparge assembly and a portion of the housing form a gas inlet zone located below the sparge assembly, and the degassing gas from the degassing gas inlet is passed through the gas inlet zone, through the sparge assembly and into the catalyst zone. The gas inlet zone is configured to produce a uniform degassing gas pressure distribution across the sparge assembly.

In other embodiments of the invention, the sulfur inlet control assembly and the sulfur outlet control assembly each comprise one or more screens that permit flow of the liquid sulfur and restrict a catalyst to the catalyst zone. Moreover, the sparge assembly comprises one or more sparge plates with a plurality of sparge apertures that permit flow of the degassing gas and restrict the catalyst to the catalyst zone.

In still other embodiments, the sparge assembly comprises at least one mesh component between the one or more sparge plates and the catalyst zone, and the at least one mesh component comprises a plurality of mesh apertures structured to prevent the catalyst from clogging the plurality of sparge apertures.

In yet other embodiments, the one or more screens are removable from the housing for servicing, and the one or more sparge plates are removable from the housing for servicing.

In other embodiments, the catalyst zone comprises a first catalyst portion proximate the sparge assembly comprising a first catalyst material and a second catalyst portion located above the first catalyst portion comprising a second material. The second catalyst portion is structured such that a downward weight exerted by the second catalyst portion on the first catalyst portion is configured to constrain motion of the first catalyst portion, and wherein the second material comprises at least one of the first catalyst material, a second catalyst material, or an inert material.

In further accord with embodiments of the invention, the catalyst zone comprises a first catalyst portion proximate the sparge assembly comprising a first catalyst material, and a second catalyst portion located above the first catalyst portion comprising a second material. The second catalyst portion is configured to replenish the first catalyst portion upon attrition of the first catalyst material, and wherein the second material comprises at least one of the first catalyst material, or a second catalyst material.

In other embodiments of the invention, the catalyst and a portion of the housing form a gas outlet zone located above the catalyst in the catalyst zone. Moreover, the gas outlet zone is structured to provide a predetermined low gas velocity to the degassing gas such that liquid droplets in the gas outlet zone flow separate from the degassing gas and flow downwards into the catalyst zone.

In still other embodiments of the invention, the catalyst zone and a portion of the housing form a gas outlet zone located above a catalyst in the catalyst zone. Moreover, the gas outlet zone comprises a demister pad located proximate the degassing gas outlet structured to capture entrained liquid droplets in the degassing gas.

In yet other embodiments of the invention, the degassing gas inlet is located above the liquid sulfur inlet and above the sparge assembly positioned below the catalyst zone. Moreover, the degassing gas received at the degassing gas inlet passes downwardly into a gas inlet zone below the sparge assembly and upwardly through the sparge assembly and the catalyst zone.

In other embodiments the invention further comprises a sump assembly operatively coupled within the housing below the sparge assembly and a dip tube operatively coupled to the catalyst zone. At least one of the sump assembly and a gas inlet zone collect the liquid sulfur when the degassing gas is shut off, and the dip tube delivers the liquid sulfur from the sump assembly to the catalyst zone when the degassing gas is turned on.

Embodiments of the invention comprise a method for degassing liquid sulfur using a contactor apparatus. The method comprises receiving liquid sulfur within a housing through a liquid sulfur inlet and receiving a degassing gas within the housing through a degassing gas inlet. The method further comprises permitting the liquid sulfur to flow through a degassing assembly in a generally horizontal direction and permitting the degassing gas to flow through the degassing assembly in a generally vertical direction. The degassing assembly comprises a sparge assembly operatively coupled to the degassing gas inlet and a sulfur control assembly. The sulfur control assembly comprises a sulfur inlet control assembly operatively coupled to the liquid sulfur inlet, and a sulfur outlet control assembly operatively coupled to a liquid sulfur outlet. The sparge assembly and the sulfur control assembly form a catalyst zone for degassing the liquid sulfur, and the liquid sulfur received at the liquid sulfur inlet is passed through the sulfur inlet control assembly and into the catalyst zone. The method further comprises permitting the liquid sulfur to flow out of the catalyst zone through the sulfur outlet control assembly and exit the housing through the liquid sulfur outlet after degassing in the catalyst zone, and permitting the degassing gas and gaseous hydrogen sulfide that was degassed from the liquid sulfur to flow out the housing through a degassing gas outlet after exiting the catalyst zone.

In furtherance of prosecution of the present invention, the sulfur inlet control assembly and a portion of the housing form a sulfur inlet zone that is configured to produce a uniform liquid sulfur pressure distribution across the sulfur control assembly. Moreover, the sulfur outlet control assembly and a portion of the housing form a sulfur outlet zone that is configured to produce the uniform liquid sulfur pressure distribution across the sulfur control assembly. Furthermore, the sparge assembly and a portion of the housing form a gas inlet zone located below the sparge assembly, wherein the degassing gas from the degassing gas inlet is passed through the gas inlet zone, through the sparge assembly and into the catalyst zone. Additionally, the gas inlet zone is configured to produce a uniform degassing gas pressure distribution across the sparge assembly.

In other embodiments of the invention, the sulfur inlet control assembly and the sulfur outlet control assembly each comprise one or more screens that permit flow of the liquid sulfur and restrict a catalyst to the catalyst zone. Moreover, the sparge assembly comprises one or more sparge plates with a plurality of sparge apertures that permit flow of the degassing gas and restrict the catalyst to the catalyst zone.

In still other embodiments of the invention, the sparge assembly comprises at least one mesh component between the one or more sparge plates and the catalyst zone, and the at least one mesh component comprises a plurality of mesh apertures structured to prevent the catalyst from clogging the plurality of sparge apertures.

In yet other embodiments of the invention, the catalyst zone comprises a first catalyst portion proximate the sparge assembly comprising a first catalyst material, and a second catalyst portion located above the first catalyst portion comprising a second material. The second catalyst portion is structured such that a downward weight exerted by the second catalyst portion on the first catalyst portion is configured to constrain motion of the first catalyst portion, and the second material comprises at least one of the first catalyst material, a second catalyst material, or an inert material.

In other embodiments of the invention, the catalyst zone comprises a first catalyst portion proximate the sparge assembly comprising a first catalyst material, and a second catalyst portion located above the first catalyst portion comprising a second material. The second catalyst portion is configured to replenish the first catalyst portion upon attrition of the first catalyst material, and the second material comprises at least one of the first catalyst material, or a second catalyst material.

In further accord with embodiments of the invention, the catalyst zone and a portion of the housing form a gas outlet zone located above a catalyst in the catalyst zone. The gas outlet zone is structured to provide a predetermined low gas velocity to the degassing gas such that liquid droplets in the gas outlet zone flow separate from the degassing gas and flow downwards into the catalyst zone.

In other embodiments of the invention, the catalyst and a portion of the housing form a gas outlet zone located above the catalyst in the catalyst zone, and the gas outlet zone comprises a demister pad located proximate the degassing gas outlet structured to capture entrained liquid droplets in the degassing gas.

In still other embodiments the invention further comprises collecting the liquid sulfur in at least one of a sump assembly and a gas inlet zone when the degassing gas is shut off, and the sump assembly is operatively coupled within the housing below the sparge assembly. Moreover, the invention comprises delivering the liquid sulfur from the sump assembly to the catalyst zone through a dip tube when the degassing gas is turned on, and the dip tube is operatively coupled to the catalyst zone.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings.

Figure 1A:
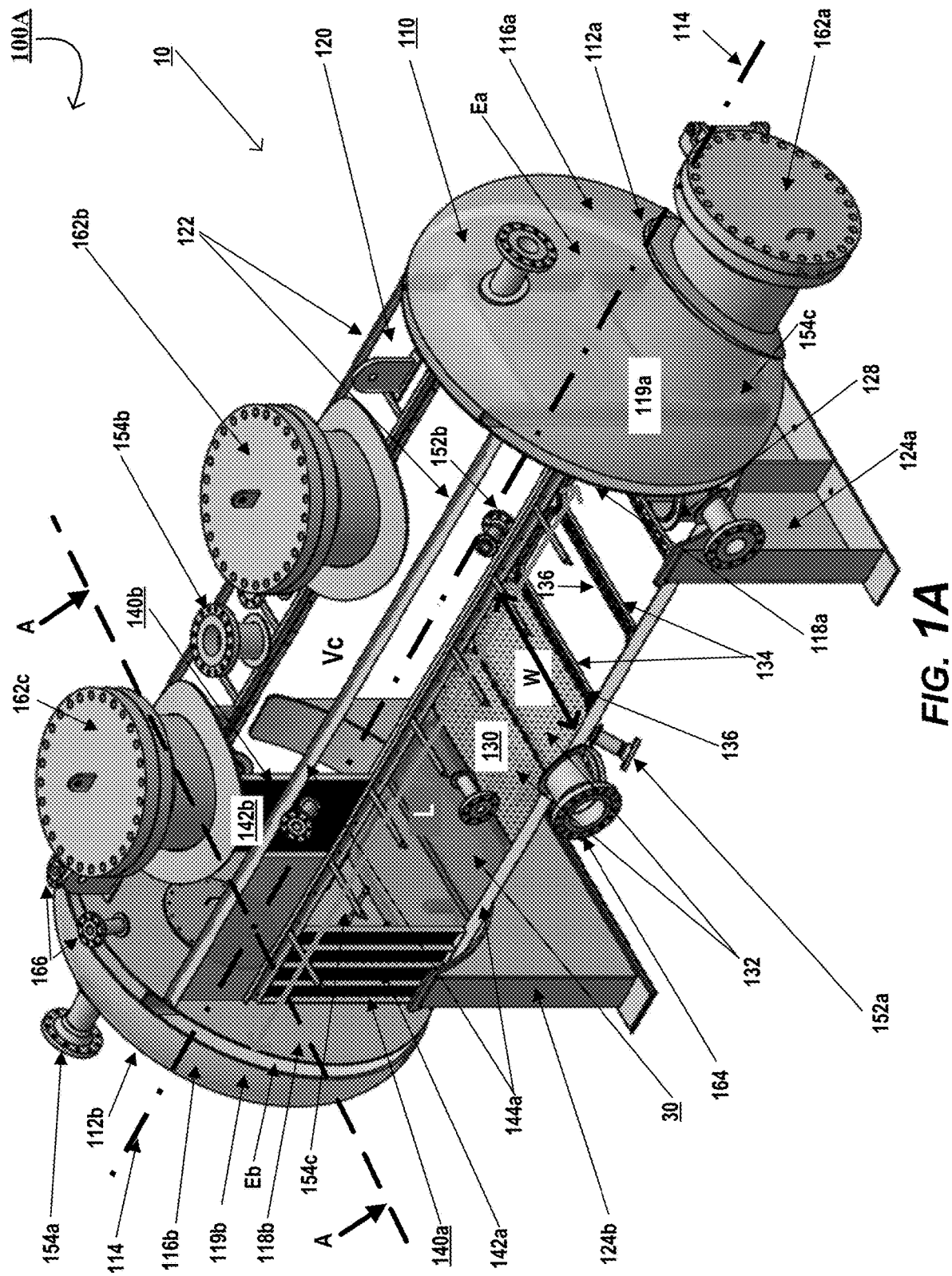

FIG. 1A illustrates a perspective cut-away view 100A of a contactor apparatus, in accordance with some embodiments of the invention.

Figure 1B:
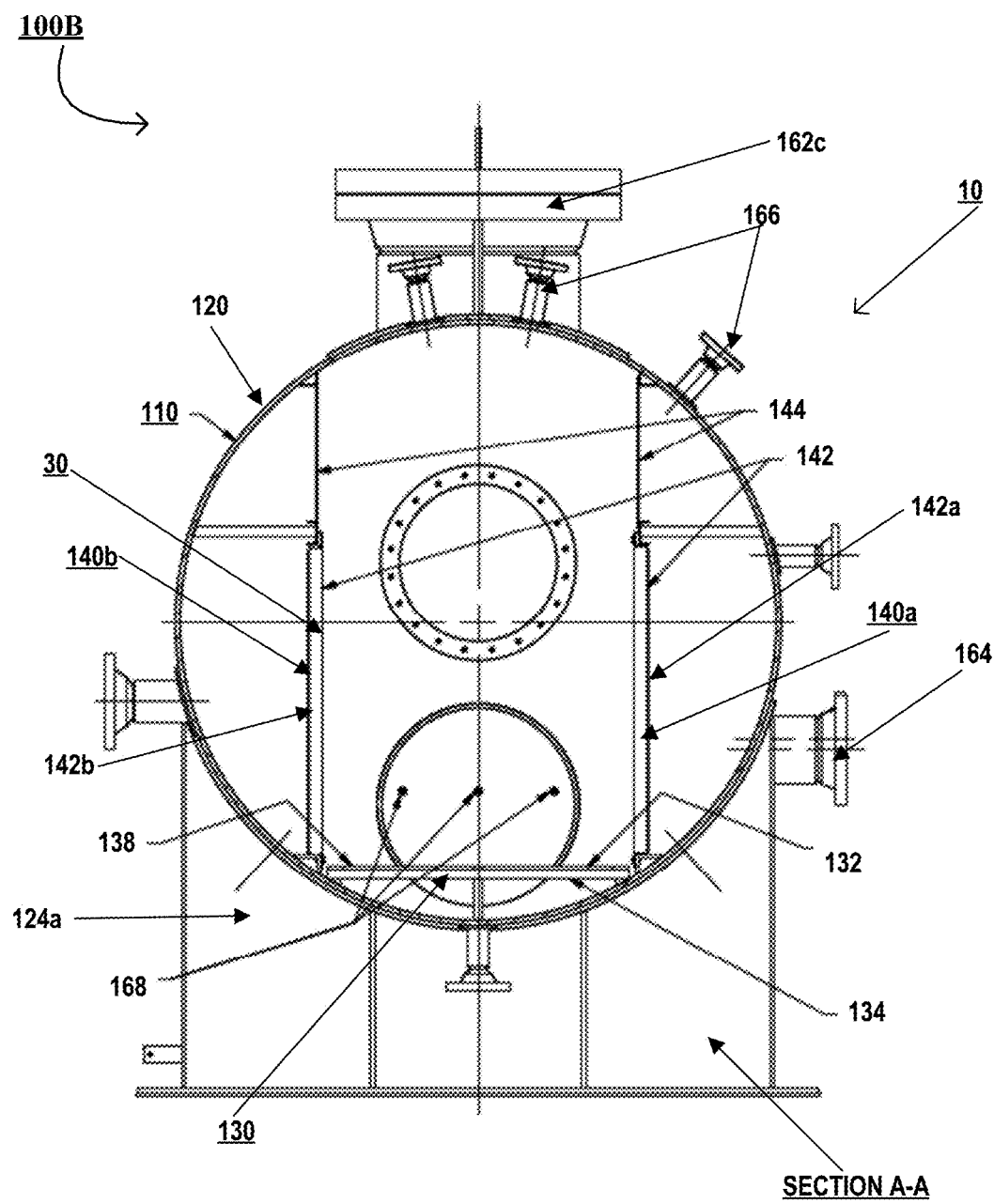

FIG. 1B illustrates a side sectional view 100B of the contactor apparatus of FIG. 1A, in accordance with some embodiments of the invention.

FIG. 2A illustrates a perspective view 200A of a contactor apparatus, in accordance with some embodiments of the invention.

FIG. 2B illustrates a side view 200B of the contactor apparatus of FIG. 2A, in accordance with some embodiments of the invention.

Figure 2D:
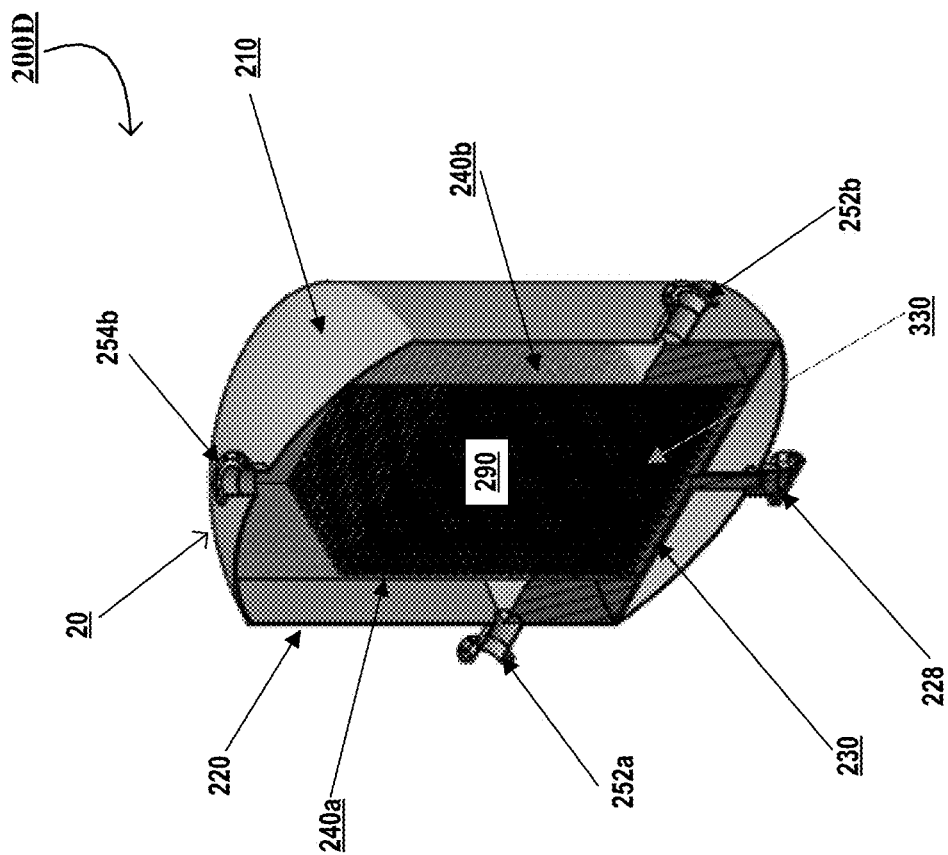
Figure 2C:
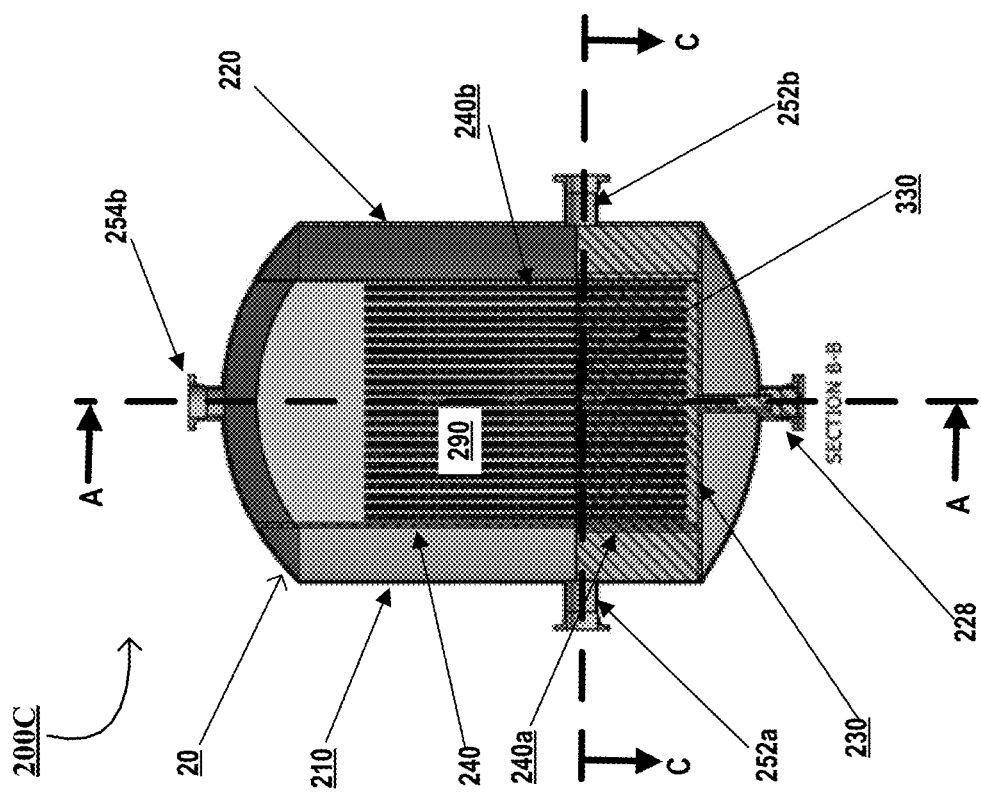

FIG. 2C illustrates a sectional view 200C of the contactor apparatus of FIG. 2B, in accordance with some embodiments of the invention.

FIG. 2D illustrates a perspective sectional view 200D of the contactor apparatus of FIG. 2B, in accordance with some embodiments of the invention.

FIG. 2E illustrates a cross-sectional view 200E of the contactor apparatus of FIG. 2C, in accordance with some embodiments of the invention.

FIG. 2F illustrates a sectional view 200F of the contactor apparatus of FIG. 2C, in accordance with some embodiments of the invention.

Figure 3:
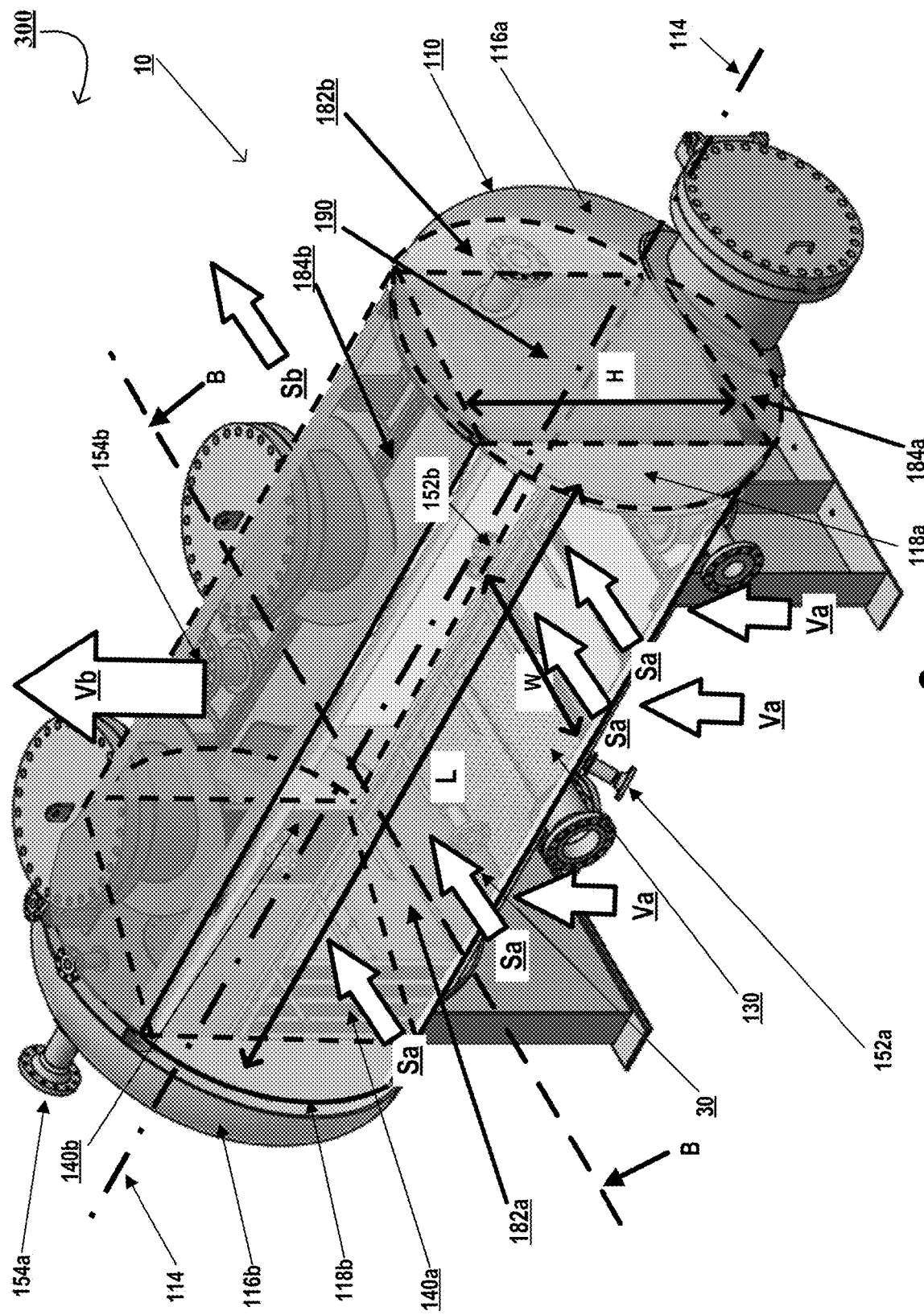

FIG. 3 illustrates a schematic perspective view 300 of the contactor apparatus of FIG. 1A, in accordance with some embodiments of the invention.

Figure 4A:
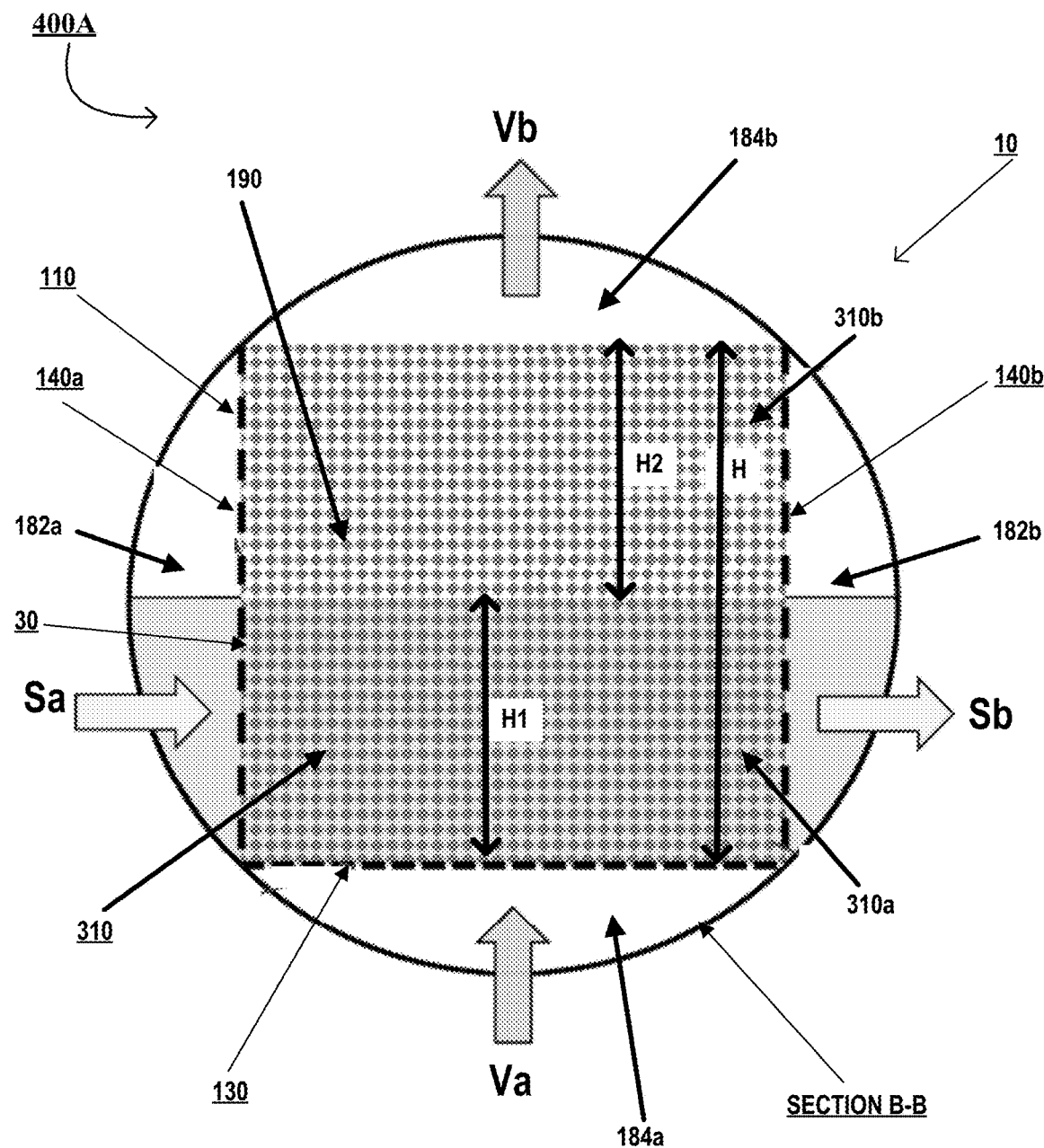

FIG. 4A illustrates a schematic sectional view 400A of the contactor apparatus of FIG. 3, in accordance with some embodiments of the invention.

Figure 4B:
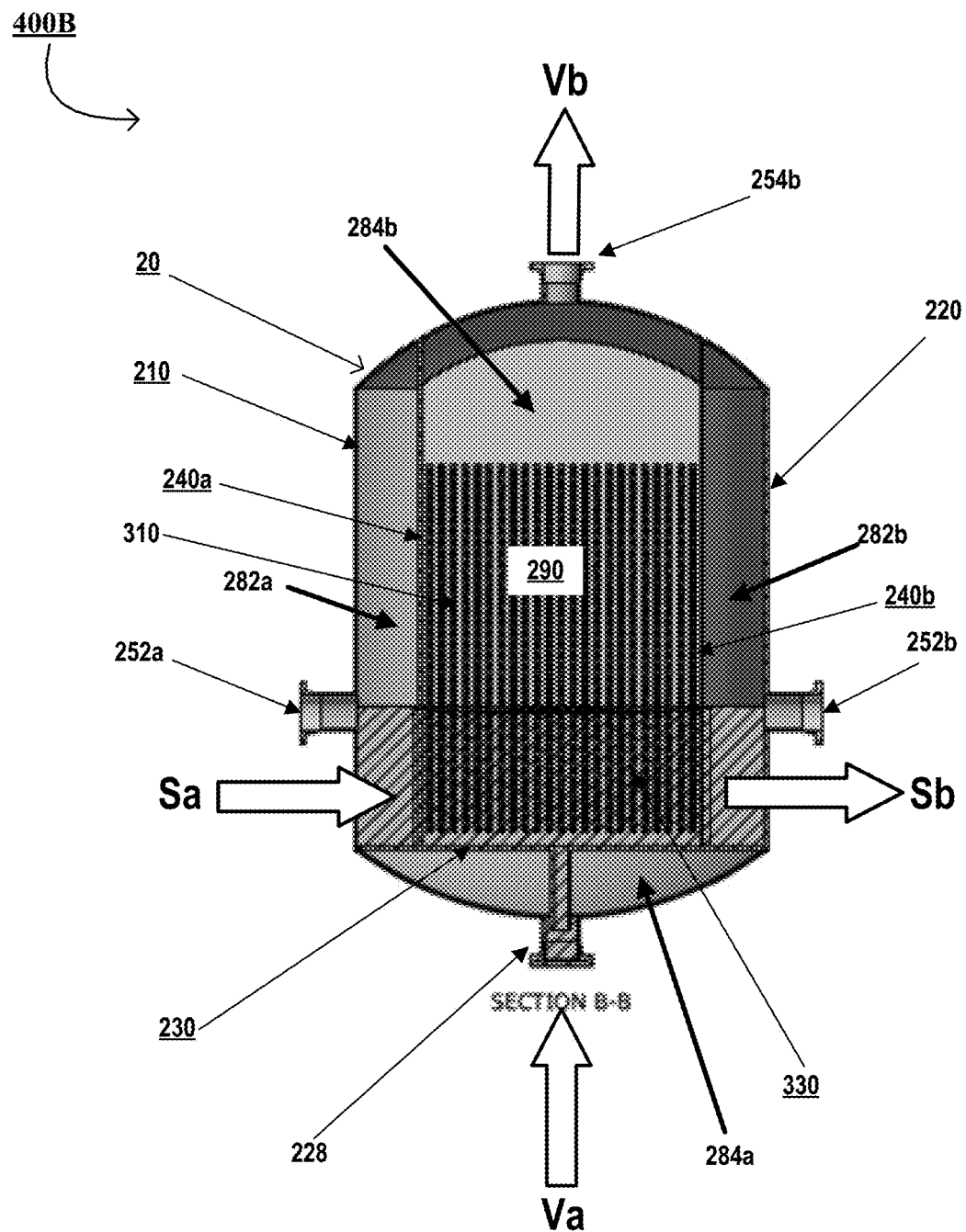
Figure 5A:
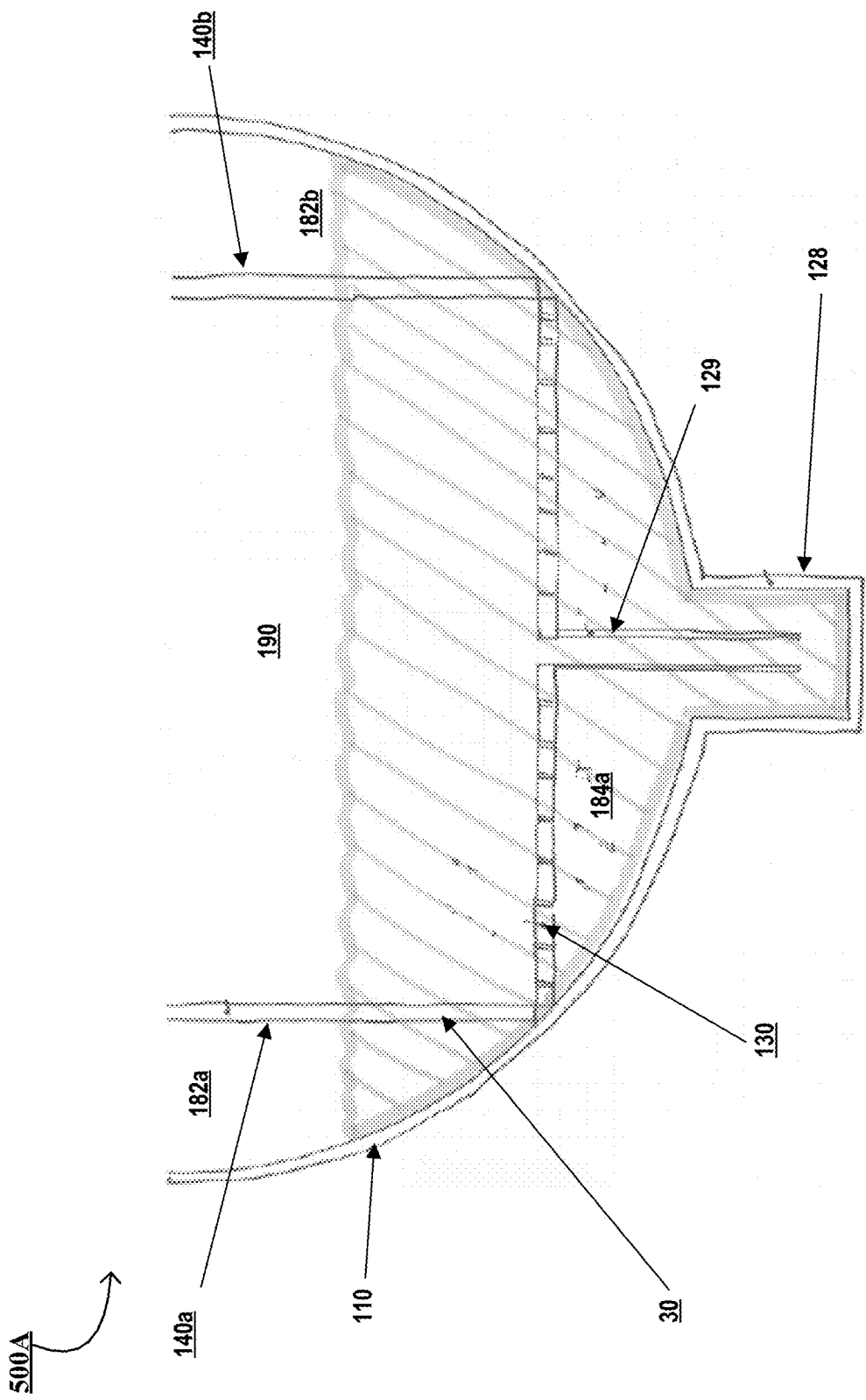

FIG. 4B illustrates a schematic sectional view 400B of the contactor apparatus of FIG. 2B along section B-B, in accordance with some embodiments of the invention FIG. 5A illustrates a schematic cut-away view 500A of the contactor apparatus of FIG. 1A, in accordance with some embodiments of the invention.

Figure 5B:
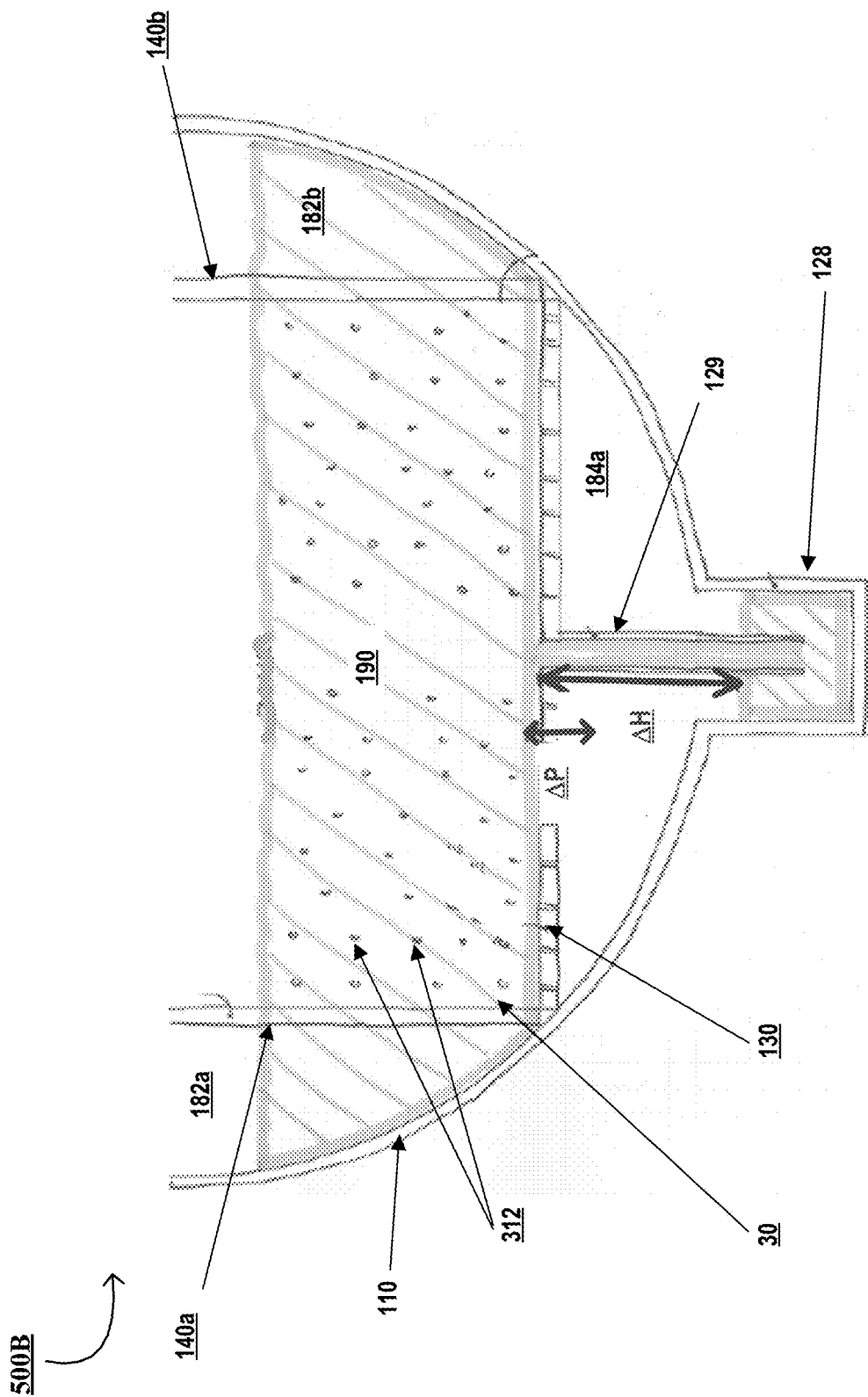

FIG. 5B illustrates a schematic cut-away view 500B of the contactor apparatus of FIG. 1A, in accordance with some embodiments of the invention.

Figure 6:
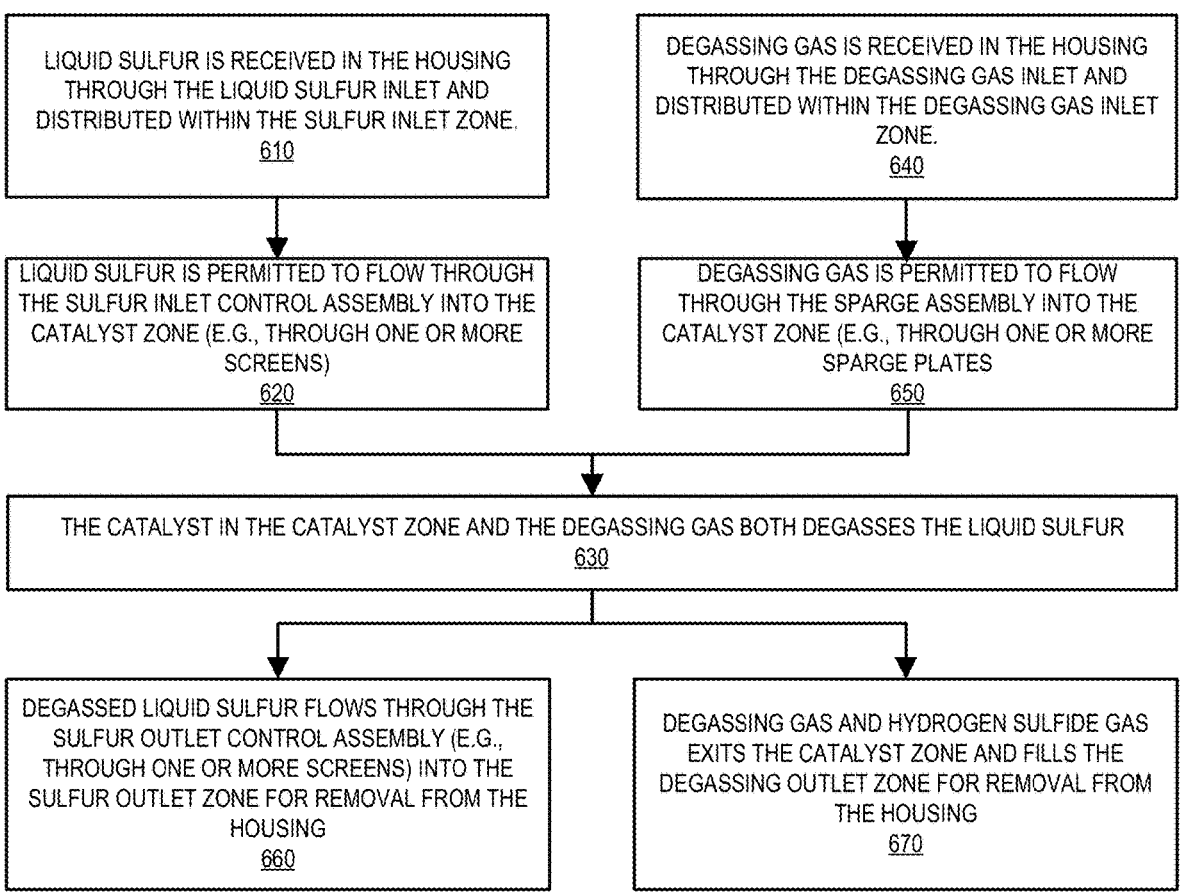

FIG. 6 illustrates a process flow for degassing liquid sulfur using a contactor apparatus, in accordance with some embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Generally, FIGS. 1A through 5B illustrate a contactor apparatus, in accordance with various embodiments of the invention. FIGS. 1A-1B, 3-4A and 5A-5B illustrate a contactor apparatus 10 comprising a housing 110 and a degassing assembly 30 operatively coupled within the housing 110, in accordance with one embodiment of the invention. The degassing assembly 30 comprises a sparge assembly 130 and a sulfur control assembly 140 (e.g., sulfur inlet control assembly 140a and a sulfur outlet control assembly 140b). The sparge assembly 130, the sulfur inlet control assembly 140a, and the sulfur outlet control assembly 140b comprise frame structures that are utilized to support various components of the assemblies, as will be described in further detail herein. The sparge assembly 130 comprises one or more sparge plates 132 that are located generally horizontally within the housing 110 in a removable fashion. The one or more sparge plates 132 comprise a plurality of sparge apertures that permit the flow of degassing gas through the sparge plates into a catalyst zone 190 comprising a catalyst located above the one or more sparge plates 132. The sulfur inlet control assembly 140a and the sulfur outlet control assembly 140b both comprise one or more screens 142 that are located vertically (or generally or approximately vertically) within the housing 110 and perpendicular (or generally or approximately perpendicular) to the sparge assembly 130. The one or more screens of each assembly (140a, 140b) permit the flow of liquid sulfur into and out of the catalyst zone 190 in a generally horizontal flow direction. It should be understood that the flow of the liquid sulfur through the catalyst in the catalyst zone 190 in combination with the flow of the degassing gas through the liquid sulfur passing through the catalyst zone is used to remove additional harmful gases (e.g., hydrogen sulfide gas) from the liquid sulfur before the degassed liquid sulfur is sent for storage and/or further transport. It should be understood that "degassing gas" as used herein, may refer to gases, vapors, gaseous mixtures, dispersion or suspension of fluids (e.g., liquids) and/or particulate in gases or vapors, and/or a combination thereof. Moreover, when the degassing gas exits the catalyst zone it is combined with the hydrogen sulfide gas that has been removed from the liquid sulfur. It should be understood that the embodiments of the invention, and additional details associated therewith are discussed in further detail below.

Similarly FIGS. 2A-2F, and 4B illustrate a contactor apparatus 20 comprising a housing 210 and a degassing assembly 330 operatively coupled within the housing 210, in accordance with embodiments of the invention. The degassing assembly 330 comprises a sparge assembly 230 and a sulfur control assembly 240 (e.g., sulfur inlet control assembly 240a and a sulfur outlet control assembly 240b, as will be described in further detail herein. The sparge assembly 230 comprises one or more sparge plates 232 that are located generally horizontally within the housing 210 in a removable fashion. The one or more sparge plates 232 comprise a plurality of sparge apertures that permit the flow of degassing gas through the sparge plates 232 into a catalyst zone 290 comprising a catalyst located above the one or more sparge plates 232. The sulfur inlet control assembly 240a and the sulfur outlet control assembly 240b both comprise one or more screens that are located vertically (or generally or approximately vertically) within the housing 210 and perpendicular (or generally or approximately) perpendicular to the sparge assembly 230. The one or more screens of each assembly (240a, 240b) permit the flow of liquid sulfur into and out of the catalyst zone 290 in a generally horizontal flow direction. It should be understood that the embodiments of the invention, and additional details associated therewith are discussed in further detail below.

FIG. 1A illustrates a perspective cut-away view 100 of a contactor apparatus 10, in accordance with some embodiments of the invention. FIG. 1B illustrates a side sectional view 200 of the contactor apparatus 10 of FIG. 1A, in accordance with some embodiments of the invention. Specifically, FIG. 1B illustrates a side sectional view 200 of the contactor apparatus 10 along the transverse section A-A illustrated in FIG. 1A.

As illustrated in FIGS. 1A-1B, the contactor apparatus 10 comprises a housing 110 (e.g., otherwise described herein as a vessel, container, vessel housing, or container housing) extending from a first end 112a to an opposing second end 112b. In some embodiments, the housing 110 defines a housing axis 114 between the first end 112a and the second end 112b. In some embodiments, the housing axis 114 is a longitudinal axis of the housing 110 (e.g., extending along a longest linear dimension of the housing 110), while in other embodiments the housing axis 114 is a transverse axis of the housing 110, e.g., extending along another dimension that is not the longest linear dimension of the housing 110. In some embodiments, the housing axis 114 extends horizontally, for example in parallel to a horizontal direction, generally parallel to the horizontal direction, or approximately parallel to the horizontal direction (e.g., within a predetermined incline with respect to the horizontal direction that is within a range of 0 to 3 degrees, 0 to 5 degrees, 0 to 10 degrees, 0 to 15 degrees, or more, or within, overlapping, or outside of these ranges, with respect to the horizontal direction, or as otherwise described herein) when positioned during use (e.g., as illustrated by contactor apparatus 10 of the embodiment illustrated in FIGS. 1A-1B, 3 and 4A). That said, in other embodiments, the housing axis 114 may extend vertically, perpendicularly to the horizontal direction or at an angle/incline with respect to the horizontal direction (e.g., as illustrated by contactor apparatus 20 of the embodiments illustrated in FIGS. 2A-2F and 4B).

As illustrated by FIG. 1A, the housing 110 comprises a containment element 120 (or containment vessel 120) having a first end component 116a at the first end 112a and a second end component 116b at the second end 112b. It is noted that FIG. 1A illustrates a cut-away view of the containment element 120. Typically, the containment element 120, together with the first end component 116a and the second end component 116b of the housing 110 define a hollow (or interior hollow) having a housing volume Vc (also referred to as a housing zone Vc). In some embodiments, the containment element 120, together with the first end component 116a and the second end component 116b of the housing 110 at least partially enclose the housing volume Vc or the housing zone Vc. In some embodiments, the containment element 120 comprises an interior cavity or hollow portion therein that forms or defines the housing volume Vc. In this regard, containment element 120 may comprise a shell structure (not illustrated) having an interior surface facing the housing volume Vc and an opposite exterior surface facing away from the housing volume Vc, with a predetermined shell thickness in between. In some embodiments, the containment element 120 is supported by a container frame 122.

In some embodiments, the containment element 120 is an elongate component extending along, or parallel to, the housing axis 114 and defining a length L along the housing axis 114. In some embodiments, the containment element 120 comprises a circular, elliptical or otherwise curved cross section, at least along a portion of its length L, when viewed perpendicular to the housing axis 114. In some embodiments, the containment element 120 may comprise a curved, a curvilinear, a polygonal cross section, and/or a combination thereof, at least along a portion of its length L, when viewed perpendicular to the housing axis 114. In some embodiments, as illustrated in FIG. 1A, the containment element 120 may comprise a generally cylindrical structure/shape (e.g., a hollow cylinder shape, or a cylinder having a through aperture) defining the length L in between the first end component 116a and the second end component 116b along the housing axis 114, with a circular (or generally or approximately circular) cross section (e.g., as illustrated by FIGS. 1B and 4A). Here, the generally cylindrical structure/ shape of the containment element 120 is configured to provide equitable distribution of pressure along its exterior (e.g., along the shell structure of the containment element 120) thereby increasing its strength and the ability to withstand circumferential (hoop) stresses, radial stresses and/or axial stresses exerted onto the containment element 120. That said, in other embodiments, the containment element 120 may comprise a generally polyhedral shape defining the length L in between the first end component 116a and the second end component 116b along the housing axis 114, with a polygonal (or generally or approximately polygonal) cross-section (e.g., square, parallelogram, trapezoid, etc.) at least along a portion of the length L.

In some embodiments, the first end component 116a positioned at the first end 112a is structured, dimensioned and shaped to cover the proximate open end of the containment element 120. In the instances where the containment element 120 comprises a generally cylindrical structure/shape (e.g., a hollow cylinder shape), the first end component 116a may comprise a planar surface proximate (or adjacent) the containment element 120 which encloses one end of the cylindrical hollow of the containment element 120, i.e., encloses the volume Vc, as illustrated by FIG. 1A. In some embodiments, the second end component 116b positioned at the second end 112b is structured, dimensioned and shaped to cover the proximate open end of the containment element 120. In the instances where the containment element 120 comprises a generally cylindrical structure/shape (e.g., a hollow cylinder shape), the second end component 116b may comprise a planar surface proximate (or adjacent) the containment element 120 which encloses one end of the cylindrical hollow of the containment element 120 opposite that of the first end component 116a, i.e., encloses the volume Vc, as illustrated by FIG. 1A. "Planar" as used herein with respect to the first and second end components (116a, 116b) may refer to a Euclidean plane in some instances (e.g., as illustrated in FIG. 1A), and/or to a plane curve or a space curve (e.g., a conic section, a spherical section, etc.) in other instances.

As illustrated by FIG. 1A, each of the first and second end components (116a, 116b) comprise a planar component (118a, 118b) positioned proximate, adjacent to or facing a proximate end of the containment element 120, respectively, on either side of the containment element 120. The planar components (118a, 118b) may comprise a generally circular cross section as illustrated in the embodiment of FIG. 1A, or one or both of the planar components (118a, 118b) may comprise a polygonal and/or a curvilinear cross section in other embodiments (e.g., when viewed perpendicular to the housing axis 114). Moreover, each of the first and second end components (116a, 116b) comprise an end cover component (119a, 119b) positioned proximate or adjacent to the corresponding planar components (118a, 118b), away from the containment element 120. Typically, each pair of planar components and end cover component ((118a, 119a), (118b, 119b)) of the corresponding first and second end components (116a, 116b) are shaped, sized, and positioned such that each pair of planar components and end cover components ((118a, 119a), (118b, 119b)) enclose (or substantially enclose) an end volume (Ea, Eb) respectively, there between. Typically, the end cover components (119a, 119b) comprise a generally concave cavity on an end facing, adjacent to or proximate the corresponding planar components (118a, 118b), such that the pair of planar components and end cover components ((118a, 119a), (118b, 119b)) define the end volume (Ea, Eb), respectively, therebetween. "Concave cavity" as used herein may refer to the end cover components being shaped, closed or represented by a non-convex set (e.g., in 3-D vector space) such that a line segment joining at least a pair of points of an end cover component lies at least partially within the concave cavity. Moreover, "concave" as used herein does not necessarily refer to a curved shape, although that may be the case in some embodiments.

One or both of the end cover components (119a, 119b) may comprise a 3-D curved contour, such as a semi-elliptical shape illustrated by FIG. 1A (referred to as "semi-elliptical heads"), an ellipsoidal shape, a spheroidal shape, an oblong shape, a cylindrical shape, sections thereof and/or combinations thereof, and/or a 3-D polyhedral contour, such as a cuboidal shape, a trapezoidal shape, a pyramid shape, sections thereof and/or combinations thereof, which define respective the concave cavities. In some embodiments, as illustrated by FIG. 1A, the end cover components (119a, 119b) are semi-elliptical heads, comprising a semi-elliptical shape or a ellipsoid sectional shape forming a concave cavity on the side facing corresponding planar components (118a, 118b), such that the that the pair of planar components and end cover components ((118a, 119a), (118b, 119b)) define the end volume (Ea, Eb), respectively, therebetween. That said, in other embodiments the configuration may be interchanged with the planar components (118a, 118b) comprising a concave cavity (or a convex cavity) on the side facing the corresponding end cover components (119a, 119b), opposite the side facing the containment element 120, and the end cover components (119a, 119b) may comprise a Euclidean plane and/or a space curve facing the planar components (118a, 118b), such that the that the pair of planar components and end cover components ((118a, 119a), (118b, 119b)) define the end volumes (Ea, Eb).

Moreover, the housing 110 further comprises one or more support frame components (124a, 124b) structured for supporting the housing 110 on a process surface (e.g., a horizontal surface), in some instances.

The housing 110 and/or its components (containment element 120, first and second end components (116a, 116b), the one or more support frame components (124a, 124b), etc.), or portions thereof, or groups thereof, may be constructed from suitable materials such as metals, alloys, composites, plastics, glass, and/or the like. In some embodiments, the housing 110 and/or its components (containment element 120, first and second end components (116a, 116b), the one or more support frame components (124a, 124b), etc.), or portions thereof, or groups thereof, may be constructed from iron alloys such as steel, alloys of aluminum, and/or the like. In some embodiments, the containment element 120, the planar components (118a, 118b) and/or the end cover components (119a, 119b) may be constructed, at least partially, from sheet metal.

As illustrated in FIG. 1A, the contactor apparatus 10 comprises a sparge assembly 130 structured for permitting the flow of (e.g., transferring, directing or otherwise conveying) a degassing gas there-through for degassing liquid sulfur. Typically, the sparge assembly 130, when positioned within the housing 110, is structured to form or define a gas inlet zone 184a (illustrated in FIG. 3 to FIG. 5B) between the sparge assembly 130 and at least a portion of the housing 110. Here, the sparge assembly 130 is structured for (i) permitting the flow of (e.g., transferring, directing or otherwise conveying) the degassing gas from the gas inlet zone 184a on one side of the sparge assembly 130 to a catalyst zone 190 (illustrated in FIG. 3 to FIG. 5B) on the opposite side and (ii) preventing the flow (e.g., preventing the transfer, direction, or conveyance) of catalyst pellets 310 (illustrated in FIG. 4A) of the catalyst zone 190 from the catalyst zone 190 to the gas inlet zone 184a. In some embodiments, a "zone" as used herein may refer to a plenum, a volume, a manifold, a hollow area, and/or the like within the housing 110, any of which may be used interchangeably in some instances.

Typically, the sparge assembly 130 comprises at least one sparge plate 132. Although referred to as at least one sparge plate 132 it is understood that the sparge assembly 130 may comprise a plurality of sparge plates 132, as illustrated in FIG. 1A. Each sparge plate may comprise a planar surface having a plurality of sparge plate apertures that are sized, shaped and dimensioned for permitting the flow of (e.g., transferring, directing or otherwise conveying) a degassing gas there-through. Moreover, in some embodiments, the plurality of sparge plate apertures of each sparge plate are sized, shaped and dimensioned for preventing transfer of, or flow of catalyst pellets 310 therethrough. The at least one sparge plate 132 is positioned within the housing volume Vc of the housing 110 such that, the at least one sparge plate 132, collectively, extends from and substantially abuts, the first planar component 118a to substantially abut the second planar component 118b defining the length L parallel to the housing axis 114. Moreover, the at least one sparge plate 132 is positioned within the housing volume Vc of the housing 110 such that, the at least one sparge plate 132 extends between two opposite portions on the interior of the containment element 120 defining a width W therebetween. As such, the at least one sparge plate 132 generally forms a chord (or secant line portion) of a width W when viewing a cross section of the contactor apparatus 10, perpendicular to the housing axis 114. In some embodiments, the width W of the at least one sparge plate 132 is lesser that a diameter of the containment element 120. In other words, in some embodiments, a plurality of sparge plates 132 may be positioned (e.g., horizontally) adjacent to or abutting each other, in a plane (e.g., a generally horizontal plane) parallel to the housing axis 114, such that the plurality of sparge plates 132 extend between the planar components (118a, 118b) defining a length L and extend between adjacent portions of the containment element 120 defining a width W perpendicular to the length L.

The at least one sparge plate 132 is coupled to and is supported by a sparge frame 134, at least a portion of which may be affixed to the interior of the containment element 120. In some embodiments, the at least one sparge plate 132 is coupled to and is supported by the sparge frame 134 such that relative motion between the at least one sparge plate 132 and the sparge frame 134 is constrained or prevented. In some embodiments, the at least one sparge plate 132 is coupled to the sparge frame 134 via one or more sealing components 136 positioned at the ends of the at least one sparge plate 132 (e.g., between a sparge plate 132 edge portion and the adjacent sparge frame 134 portion and/or between adjacent edge portions of two adjacent sparge plates 132). The one or more sealing components 136 may comprise mechanical seal components such as gaskets, flanges, sealants, clips, channels and/or the like, and/or fit type seals based on providing predetermined allowances and/or tolerances and material properties to obtain a press fit or interference fit, or a snap fit between the at least one sparge plate 132 and the sparge frame 134, to prevent gaps at the seal or to ensure that clearance of the seal/gap dimensions are smaller than the size of the catalyst pellets 310. In this way, a seal can be provided between the gas inlet zone 184a (illustrated in FIG. 3 to FIG. 5B) on one side of the sparge assembly 130 and the catalyst zone 190 (illus-trated in FIG. 3 to FIG. 5B) on the opposite side of the sparge assembly 130 such that only the flow of the degassing gas from the gas inlet zone 184a to the catalyst zone 190 (illustrated in FIG. 3 to FIG. 5B) is allowed. It is noted that FIG. 1A illustrates the sparge assembly 130 with one or more sparge plates 132 removed for the purposes of illustration. In some embodiments, the one or more sparge plates 132 are constructed out of a fibrous material (e.g., to allow flexibility), a metal, a composite, an alloy and/or a combination thereof.

In some embodiments, the sparge assembly 130 comprises at least one mesh component 138 (illustrated in FIG. 1B) positioned on the surface of the at least one sparge plate 132 facing the catalyst zone 190. The mesh component comprises a plurality of mesh apertures which may be smaller in size and of a different shape than the plurality of sparge plate apertures. The mesh apertures are sized, shaped and/or dimensioned to prevent catalyst pellets 310 from being lodged within the mesh apertures and/or the sparge plate apertures, and/or to facilitate dislodging of any wedged/stuck catalyst pellets 310 by flow of liquid sulfur in the catalyst zone 190.

In some embodiments, the sparge assembly 130 is oriented horizontally (or generally or approximately horizontally) within the housing 110 such that the catalyst zone 190 is located above the sparge assembly 130 and the gas inlet zone 184a is located below the sparge assembly 130, such that a flow of degassing gas through the sparge assembly 130 in the upwards direction is facilitated, while downwards flow of catalyst pellets 310 are prevented therethrough.

As illustrated in FIG. 1A, the contactor apparatus 10 further comprises a sulfur control assembly 140 structured for permitting the flow of (e.g., transferring, directing or otherwise conveying) liquid sulfur there-through. Specifically, the sulfur control assembly 140 comprises a sulfur inlet control assembly 140a for permitting the flow of (e.g., transferring, directing or otherwise conveying liquid sulfur) from a sulfur inlet zone 182a on one side of the sulfur inlet control assembly 140a to the catalyst zone 190 (illustrated in FIGS. 3 to 5B) on the opposite side, for degassing of the liquid sulfur. The sulfur control assembly 140 further comprises a sulfur outlet control assembly 140b for permitting the flow of (e.g., transferring, directing or otherwise conveying) degassed liquid sulfur from the catalyst zone 190 on one side of the sulfur outlet control assembly 140b to a sulfur outlet zone 182b (illustrated in FIG. 3 to FIG. 5B) on the opposite side. Typically, the sulfur inlet control assembly 140a is positioned within the housing 110, extending along an end of the sparge assembly 130 defining a length L, perpendicularly to or at an angle with the sparge assembly 130, and forms the sulfur inlet zone 182a (illustrated in FIGS. 3 to 5B) between the sulfur inlet control assembly 140a and at least portion of the housing 110. The sulfur outlet control assembly 140b is positioned within the housing 110, extending along an opposite end of the sparge assembly 130 to that of the sulfur inlet control assembly 140a, perpendicularly to or at an angle with the sparge assembly 130, and forms the sulfur outlet zone 182b (illustrated in FIGS. 3 to 5B) between the sulfur outlet control assembly 140b and at least portion of the housing 110. As such, the sulfur inlet control assembly 140a and the sulfur outlet control assembly 140b define opposite sides of the catalyst zone 190, the sparge assembly 130 forms a base of the catalyst zone 190, and the planar components (118a, 118b) form ends of the catalyst zone 190, in some embodiments. As alluded to previously, in some embodiments, a "zone" as used herein may refer to a plenum, a volume, a manifold, a hollow, and/or the like within the housing 110, any of which may be used interchangeably in some instances. As discussed above, the sulfur control assembly 140 (e.g., sulfur inlet control assembly 140a and sulfur outlet control assembly 140b) and the sparge assembly 130 comprise a degassing assembly.

Typically, each of the sulfur inlet and outlet control assemblies (140a, 140b) may comprise one or more screens or mesh structures (142a, 142b), respectively, that comprise one or more slits or apertures for permitting the flow (e.g., transferring, directing, filtering and/or otherwise controlling the flow) of liquid sulfur therethrough. In some embodiments, the one or more screens (142a, 142b) comprise parallel wedge wires, "V-shaped" wires or "D-shaped" wires that define flow apertures therebetween. In some embodiments, these wedge wires, "V-shaped" wires or "D-shaped" wires extend in a direction transverse to the housing axis 14, such that a flat, planar side of the wire is positioned facing the catalyst zone 190 parallel to the housing axis 114, while the pointed or curved side is posited away from the catalyst zone 190. Moreover, the plurality of apertures of the sulfur inlet and outlet control assemblies (140a, 140b) are sized, shaped and dimensioned for preventing the flow (e.g., transfer of, or the like) of catalyst pellets 310 therethrough, while allowing flow of liquid sulfur. In some embodiments, a size of the plurality of apertures of the sulfur inlet and outlet control assemblies (140a, 140b) are smaller than that of the plurality of sparge plate apertures, and/or that of the plurality of mesh apertures.

The sulfur inlet control assembly 140a is positioned within the housing volume Vc of the housing 110 such that, the sulfur inlet control assembly 140a extends between and substantially abuts the planar component (118a, 118b), defining the length L parallel to the housing axis 114, and positioned adjacent to or abutting an end of the sparge assembly 130 to form a perpendicular angle (or generally or approximately perpendicular angle) with the sparge assembly 130. As such, the sulfur inlet control assembly 140a generally forms a chord (or secant line portion) when viewing a cross section of the contactor apparatus 10, perpendicular to the housing axis 114. The sulfur inlet control assembly 140a may be supported by an inlet frame structure 144a, such that relative motion between the sulfur inlet control assembly 140a and the inlet frame structure 144a is constrained or prevented. In some embodiments, the sulfur inlet control assembly 140a is coupled to the inlet frame structure 144a via one or more sealing components, similar to those described previously.

The sulfur outlet control assembly 140b is positioned within the housing volume Vc of the housing 110 such that, the sulfur outlet flow control assembly 140b extends between and substantially abuts the planar component (118a, 118b), defining the length L parallel to the housing axis 114, and positioned adjacent to or abutting an end of the sparge assembly 130 to form a perpendicular angle (or generally or approximately perpendicular angle) with the sparge assembly 130, parallel to the sulfur inlet control assembly 140a. As such, the sulfur outlet control assembly 140, generally forms a chord (or secant line portion) when viewing a cross section of the contactor apparatus 10, perpendicular to the housing axis 114. The sulfur outlet control assembly 140b may be supported by an outlet frame structure 144b (not illustrated), such that relative motion between the sulfur outlet flow control assembly 140b and the outlet frame structure 144b is constrained or prevented. In some embodiments, the sulfur outlet control assembly 140b is coupled to the outlet frame structure 144b via one or more sealing components, similar to those described previously. It is noted that FIG. 1A illustrates the sulfur control assembly 140 with one or more screens (142a, 142b) removed for the purposes of illustration. It should be understood that the inlet frame structure 144a and the outlet frame structure 144b, and/or the sparge frame structure 134 may be generally described as a degasser frame structure.

In some embodiments, the sulfur control assembly 140 is oriented vertically (or generally or approximately vertically) within the housing 110 such that the catalyst zone 190 is located in between the sulfur inlet and outlet control assemblies (140a, 140b). Here, a flow of liquid sulfur through the sulfur inlet flow control assembly 140a (from the sulfur inlet zone 182a), onto the catalyst zone 190, and thence onto the sulfur outlet zone 182b via the sulfur outlet control assembly 140b, is in a generally horizontal direction, perpendicular to the housing axis 114.

As illustrated in FIG. 1A, the contactor apparatus 10 further comprises, one or more ports. Specifically, the contactor apparatus 10 comprises a sulfur inlet port 152a structured for receiving liquid sulfur to be degassed and conveying the liquid sulfur into the sulfur inlet zone 182a. The contactor apparatus 10 comprises a sulfur outlet port 152b structured for conveying degassed liquid sulfur away from the sulfur outlet zone 182b. In some embodiments, an altitude or height of the position of the sulfur inlet and outlet ports (152a, 152b) with respect to a horizontal surface parallel to the housing axis 114, is substantially the same. As described above, in some embodiments, a flow of liquid sulfur through the sulfur inlet control assembly 140a (from the sulfur inlet zone 182a via the sulfur inlet port 152a), onto the catalyst zone 190, and thence onto the sulfur outlet zone 182b and out of the sulfur outlet port 152b, is in a generally horizontal direction, perpendicular to the housing axis 114.

The contactor apparatus 10 further comprises a degassing gas inlet port 154a structured for receiving degassing gas for degassing the liquid sulfur and conveying the same into the gas inlet zone 184a. As described above, in some embodiments, a flow of degassing gas (which could be vapor in some cases) through the gas inlet zone 184a, via the sparge assembly 130 and through the catalyst zone 190 is in a generally upward or vertical direction. However, in order to prevent a downward flow or backflow of any remnants of liquid sulfur or degassing gas from the catalyst zone into the gas inlet port 154a (e.g., when the degassing gas is not being supplied there-through), the gas inlet port 154a may be positioned at a height above the sparge assembly 130 and/or above the gas inlet zone 184a, as illustrated by FIG. 1A. As will be described in detail later on, the contactor apparatus 10 may further comprise an intermediate gas inlet manifold 154c that fluidically connects the gas inlet port 154a and the gas inlet zone 184a that is typically located below the sparge assembly 130. The intermediate gas inlet manifold 154c is structured for conveying degassing gas received into the gas inlet port 154a into the gas inlet zone 184a. In some embodiments, the intermediate gas inlet manifold 154c comprises at least a portion of the second end volume Eb between the planar component 118b and the corresponding end cover component 119b. Here, the degassing gas received at the gas inlet port 154a may be conveyed through the second end volume Eb (i.e., intermediate gas inlet manifold 154c) and into the gas inlet zone 184a, e.g., via an aperture in the planar component 118b. Similarly, in some embodiments, alone or in combination with the above, the intermediate gas inlet manifold 154c comprises at least a portion of the first end volume Ea between the planar component 118a and the corresponding end cover component 119a.

Here, the degassing received at the gas inlet port 154a (or another gas inlet port located proximate the upper portion of the first end component 116a) may be conveyed through the first end volume Ea (i.e., intermediate gas inlet manifold 154c) and into the gas inlet zone 184a, e.g., via an aperture in the planar component 118a. The contactor apparatus 10 further comprises a degassing gas outlet port 154b, typically positioned at a height above the gas inlet port 154a (e.g., at a top portion of the containment element 120 proximate the gas inlet zone 184), structured for conveying degassing gas out of the gas inlet zone 184. It is noted that the gas inlet port 154a may comprise a plurality of ports, each located at a suitable location at the housing 110, or the gas inlet port 154a itself may be located at a suitable location at the housing 110, so as to provide the functions described herein.

As illustrated in FIG. 1A, the housing 110 comprises a sump assembly 128 at the gas inlet zone 184a, as described in detail with respect to FIGS. 5A and 5B below.

As illustrated in FIG. 1A, the contactor apparatus 10 further comprises one or more access openings 162a-162c at suitable locations on the containment element 120. In some embodiments, the sparge assembly 130 is assembled and/or disassembled within the housing 110 by inserting or removing each of the plurality of (or at least one) sparge plates 132 through one or more of the access openings 162a-162c. Similarly, each of the sulfur inlet and outlet control assemblies (140a, 140b) may be assembled and/or disassembled within the housing 110 by inserting or removing each of the one or more screens (142a, 142b) through one or more of the access openings 162a-162c. Similarly, the plurality of (or at least one) sparge plates 132, the one or more screens (142a, 142b), and/or the like may be removed for repair or replacement through one or more of the access openings 162a-162c. In some embodiments, the contactor apparatus 10 further comprises one or more side glasses 164 for facilitating viewing of the interior of the housing 110. In some embodiments, the contactor apparatus 10 further comprises one or more instrumentation ports 166 for facilitating one or more sensors such as liquid level sensors, pressure sensors, temperature sensors, etc. In some embodiments, as illustrated by FIG. 1B, the contactor apparatus 10 further comprises one or more side sample ports 168 for facilitating sampling of liquid sulfur and/or the degassing gas from the interior of the housing 110.

FIGS. 2A-2F illustrate a contactor apparatus 20, in accordance with some embodiments of the invention. The contactor apparatus 20, its construction, components, functions, and use are typically substantially similar to that of the contactor apparatus 20 described with respect to FIGS. 1A, 1B and 3, except that the contactor apparatus 20 comprises a vertically, or generally or approximately vertical, orientation. In particular, FIG. 2A illustrates a perspective view 200A of a contactor apparatus, in accordance with some embodiments of the invention. FIG. 2B illustrates a side view 200B of the contactor apparatus of FIG. 2A, in accordance with some embodiments of the invention. FIG. 2C illustrates a sectional view 200C of the contactor apparatus of FIG. 2B along section B-B, in accordance with some embodiments of the invention. FIG. 2D illustrates a perspective sectional view 200D of the contactor apparatus of FIG. 2B along section B-B, in accordance with some embodiments of the invention. FIG. 2E illustrates a cross-sectional view 200E of the contactor apparatus of FIG. 2C along section C-C, in accordance with some embodiments of the invention. FIG. 2F illustrates a sectional view 200F of the contactor apparatus of FIG. 2C along section A-A, in accordance with some embodiments of the invention.

As illustrated in FIGS. 2A-2F, the contactor apparatus 20 comprises a housing 210 (e.g., otherwise described herein as a vessel, container, vessel housing, or container housing) extending from a first end 212a to an opposing second end 212b defining a housing axis 214 therebetween. In some embodiments, the housing axis 214 is a longitudinal axis of the housing 210 (e.g., extending along a longest linear dimension of the housing 210), while in other embodiments the housing axis 214 is a transverse axis of the housing 210 (e.g., extending along another dimension that is not the longest linear dimension of the housing 210). In some embodiments, the housing axis 214 extends vertically, in parallel to a vertical direction, or generally or approximately parallel to the vertical direction (e.g., within a predetermined incline with respect to the vertical direction (e.g., within a range of 0 to 3 degrees, 0 to 5 degrees, or 0 to 10 degrees or more, 0 to 15 degrees, or within, overlapping, or outside of these ranges, with respect to the horizontal direction, or as otherwise described herein) when positioned during use.

As illustrated by FIG. 2A, the housing 210 comprises a containment element 220 (or containment vessel 220). In some embodiments, the containment element 220 is an elongate component extending along, or parallel to, the housing axis 214. In some embodiments, the containment element 220 comprises a circular, elliptical or otherwise curved cross section, at least along a portion of its length, when viewed perpendicular to the housing axis 214. In some embodiments, the containment element 220 may comprise a curved, a curvilinear, a polygonal cross section, and/or a combination thereof, at least along a portion of its length L, when viewed perpendicular to the housing axis 214. In some embodiments, the containment element 220 may comprise a generally cylindrical structure/shape (e.g., a hollow cylinder shape, or a cylinder having a through aperture), with a circular (or generally or approximately circular) cross section. Here, the cylindrical (or generally or approximately cylindrical) structure/shape of the containment element 220 is configured to provide equitable distribution of pressure along its exterior (e.g., along the shell structure of the containment element 220) thereby increasing its strength and the ability to withstand circumferential (hoop) stresses, radial stresses and/or axial stresses exerted onto the containment element 220. That said, in other embodiments, the containment element 220 may comprise a polyhedral shape (or generally or approximately polyhedral), with a polygonal (or generally or approximately polygonal) cross-section (e.g., square, parallelogram, trapezoid, etc.) at least along a portion of the length. The housing 210 and/or its components, or portions thereof, or groups thereof, may be constructed from suitable materials such as metals, alloys, composites, plastics, glass, and/or the like, as discussed previously.

As illustrated by FIGS. 2C-2D and 2F in particular, the contactor apparatus 20 comprises a sparge assembly 230 structured for permitting the flow of (e.g., transferring, directing or otherwise conveying) a degassing gas therethrough for degassing liquid sulfur. The sparge assembly 230 comprises at least one sparge plate or a plurality of sparge plates each having a plurality of sparge plate apertures, similar to the sparge plates 132 described previously. The sparge assembly 230 may further comprise a sparge frame, one or more sealing components, and/or the like as described previously with respect to the sparge assembly 130. The sparge assembly 230 is oriented horizontally (or generally or approximately horizontally) within the housing 210 such that the catalyst zone 290 is located above the sparge assembly 230, such that a flow of degassing gas through the sparge assembly 230 in the upwards direction is facilitated, while downwards flow of catalyst pellets 310 (illustrated in FIG. 4B) are prevented therethrough.

As illustrated in FIGS. 2A-2F, the contactor apparatus 20 further comprises a sulfur control assembly 240 structured for permitting the flow of (e.g., transferring, directing or otherwise conveying) liquid sulfur there-through. Specifically, the sulfur control assembly 240 comprises a sulfur inlet control assembly 240a for permitting the flow of (e.g., transferring, directing or otherwise conveying liquid sulfur) from a sulfur inlet port 252a on one side of the sulfur inlet control assembly 240a through the catalyst zone 290 to the opposite side, for degassing of the liquid sulfur. The sulfur control assembly 240 further comprises a sulfur outlet control assembly 240b for permitting the flow of (e.g., transferring, directing or otherwise conveying) degassed liquid sulfur from the catalyst zone 290 on one side of the sulfur outlet control assembly 240b to a sulfur outlet port 252b on the opposite side. Typically, each of the sulfur inlet and outlet control assemblies (240a. 240b) are positioned within the housing 210, extending along an opposite end of the sparge assembly 230, perpendicularly to or at an angle with the sparge assembly 230. As discussed above, the sulfur control assembly 240 (e.g., sulfur inlet control assembly 240a and sulfur outlet control assembly 240b) and the sparge assembly 230 together comprise a degassing assembly 330. Typically, each of the sulfur inlet and outlet control assemblies (240a, 240b) may comprise one or more screens or mesh structures that comprise one or more slits or apertures for permitting the flow (e.g., transferring, directing, filtering and/or otherwise controlling the flow) of liquid sulfur therethrough, similar to the one or more screens or mesh structures (142a, 142b) described previously. Moreover, the sulfur inlet and outlet control assemblies (240a, 240b) may comprise frame structures, sealing components and/or the like, similar to those described previously. In some embodiments, the sulfur control assembly 240 is oriented vertically (or generally or approximately vertically) within the housing 210 such that the catalyst zone 290 is located in between the sulfur inlet and outlet control assemblies (240a, 240b). Here, a flow of liquid sulfur through the sulfur inlet flow control assembly 240a (from the sulfur inlet zone 282a), onto the catalyst zone 290, and thence onto the sulfur outlet zone 282b via the sulfur outlet control assembly 240b, is in a generally horizontal direction, perpendicular to the housing axis 214.

As illustrated in FIGS. 2A-2F, the contactor apparatus 20 further comprises, one or more ports. Specifically, the contactor apparatus 20 comprises a sulfur inlet port 252a structured for receiving liquid sulfur to be degassed and a sulfur outlet port 252b structured for conveying degassed liquid sulfur away from the housing 210. In some embodiments, an altitude or height of the position of the sulfur inlet and outlet ports (252a, 252b) with respect to a horizontal surface perpendicular to the housing axis 214, is substantially the same. The contactor apparatus 20 further comprises a degassing gas inlet port 254a structured for receiving degassing gas and a degassing gas outlet port 254b structured for conveying degassing gas out of the gas inlet zone 284. As described above, in some embodiments, a flow of degassing gas (which could be vapor in some cases) through the sparge assembly 230 and through the catalyst zone 290 is in a generally upward or vertical direction. However, in order to prevent a downward flow or backflow of any remnants of liquid sulfur or degassing gas from the catalyst zone into the gas inlet port 254a (e.g., when the degassing gas is not being supplied there-through), the gas inlet port 254a may be positioned at a height above the sparge assembly 230, as illustrated by FIG. 2F. The contactor apparatus 20 may further comprise an intermediate gas inlet manifold 254c that fluidically connects the gas inlet port 254a and a gas inlet zone 284a that is typically located below the sparge assembly 230. The intermediate gas inlet manifold 254c is structured for conveying degassing gas received into the gas inlet port 254a into the gas inlet zone 284a. It is noted that the gas inlet port 254a may comprise a plurality of ports, each located at a suitable location at the housing 210, or the gas inlet port 254a itself may be located at a suitable location at the housing 210, so as to provide the functions described herein. The housing 210 may comprise a sump assembly 228 at the gas inlet zone 284a, as described in detail with respect to FIGS. 5A and 5B below. The contactor apparatus 20 may further comprise one or more access openings, one or more side glasses, one or more instrumentation ports, and/or the like at suitable locations, as described previously.

The sulfur degassing process of the contactor apparatus (10, 20) will be described using the schematic diagrams of FIGS. 3 and 4A-4B. FIG. 3 illustrates a schematic perspective view 300 of the contactor apparatus of FIG. 1A, in accordance with some embodiments of the invention. FIG. 4A illustrates a schematic sectional view 400A of the contactor apparatus of FIG. 3 along the section B-B, in accordance with some embodiments of the invention. FIG. 4B illustrates a schematic sectional view 400B of the contactor apparatus of FIG. 2B along section B-B, in accordance with some embodiments of the invention.

Now referring to FIGS. 3 and 4A illustrating the contactor apparatus 10, as discussed, in some embodiments, the catalyst zone 190 comprises a cuboidal shape (or generally or approximately a cuboidal shape), with (i) the sulfur inlet control assembly 140a and the sulfur outlet control assembly 140b (e.g., along with frame structures (144a, 144b)) defining opposite sides of the catalyst zone 190 (providing a height H of the catalyst zone 190), (ii) the sparge assembly 130 forming a base of the catalyst zone 190 (providing a width W of the catalyst zone 190), and the planar components (118a, 118b) forming ends of the catalyst zone 190 (hence providing a length L of the catalyst zone 190). In some instances, the sides of height H of the catalyst zone 190 may be provided by a combination of the sulfur inlet or outlet control assembly (140a, 140b) in combination with the corresponding frame structure (144a, 144b) above. In other instances, the sides of height H of the catalyst zone 190 may be provided by the sulfur inlet and outlet flow control assemblies (140a, 140b) themselves, each having a height H. In some embodiments, the cuboidal shape (or generally or approximately cuboidal shape) of the catalyst zone 190 may comprise a square or rectangular cross section with a length L. As such, the height H and the width W may be equal, substantially equal or different.

In some embodiments, the magnitude of the width W is constant or substantially constant along the length L and height H of the catalyst zone 190 to facilitate (i) identical and uniform flow velocity of liquid sulfur horizontally (directions (Sa, Sb), perpendicularly through the sulfur inlet and outlet control assemblies (140a, 140b)) across the height H and length L, and/or (ii) equitable contact between the liquid sulfur and the catalyst pellets 310 and/or the degassing gas, to ensure uniform and steady degassing of all of the liquid sulfur. Here, uneven degassing of portions of liquid sulfur is prevented. For instance, if the width of the catalyst zone 190 was lesser at height Hlow proximate the sparge assembly 130 than at a height Hup above the height Hlow, the liquid sulfur would travel a longer length through the catalyst 310 at the height Hup than at height Hlow, resulting in uneven exposure to the catalyst and hence uneven degassing of the liquid sulfur. Similarly, in some embodiments, the magnitude of the height H is constant or substantially constant along the length L and width W of the catalyst zone 190 to facilitate (i) identical and uniform flow velocity of degassing gas vertically (directions (Va, Vb), perpendicularly through the sparge assembly 130) across the length L and width W, and/or (ii) equitable contact between the liquid sulfur and the catalyst pellets 310 and/or the degassing gas, to ensure uniform and steady degassing of all of the liquid sulfur. In other words, in such embodiments, the sulfur inlet and outlet control assemblies (140a, 140b) are parallel (or generally or approximately parallel) to each other, and the sparge assembly 130 is perpendicular to (or generally or approximately perpendicular to) the sulfur inlet and outlet control assemblies (140a, 140b). In other embodiments, the magnitude of these dimensions may be varied relative to each other to customize and control the degassing of the liquid sulfur.

Moreover, a plurality of catalyst pellets 310 may be provided at, and contained within, the catalyst zone 190. As used herein, catalyst pellets 310 may refer to a catalyst in the form of balls, spheroids, granules, globules, extrudates, beads, and/or particles, catalyst in the form of a porous structural catalyst, and/or the like. The catalyst pellets 310 may be sized, dimensioned and shaped, and their density within the catalyst zone 190 (e.g., loosely or tightly packed) is configured such that, (i) the pellets 310 provide sufficient contact area and ease of flow for the liquid sulfur and the degassing gas, and (ii) the flow of catalyst pellets 310 out of the catalyst zone 190 (i.e., through the sparge assembly 130 and/or sulfur inlet and outlet control assemblies (140a, 140b), and/or into the gas outlet zone 184b) is constrained or prevented.

As illustrated in FIG. 4A in particular, the catalyst zone 190 comprises a plurality of catalyst pellets 310. In some embodiments, the plurality of catalyst pellets 310 may be provided to around about the height H of the catalyst zone 190. The height H of the catalyst zone 190 is typically greater than a height, head or level of flow of liquid sulfur H1 (in generally horizontal directions (Sa, Sb)) through the catalyst zone 190. By providing the plurality of catalyst pellets 310 to a height above the level of flow of liquid sulfur, the excess of the catalyst pellets 310b (height H2) nor submerged in the liquid sulfur, provided above the catalyst pellets 310a (e.g., at or about the level of flow of liquid sulfur H1), provide a downward weight (opposite direction Vb) onto the catalyst pellets 310a which prevents the catalyst pellets 310a from being carried out of the catalyst zone 190 by the degassing gas in the direction Vb. Moreover, the downward weight (opposite direction Vb) provided onto the catalyst pellets 310a prevents the catalyst pellets 310a from rubbing against each other thereby preventing wear and increasing the life span of the catalyst pellets 310a. However, in the event of attrition of catalyst pellets 310a (e.g., if catalyst pellets 310a deteriorate, disintegrate or otherwise depreciate during use), the catalyst pellets 310b would move down and replenish the catalyst pellets below, thereby ensuring adequate presence of catalyst pellets at least about the level of flow of liquid sulfur. In some embodiments, the catalyst pellets 310a and 310b are the same or similar with respect to their composition, material, dimensions etc., while in other embodiments the catalyst pellets 310a and 310b are different with respect to their composition, material, dimensions, etc. In some embodiments, a first type of catalyst 310a is provided in the catalyst zone 190 to a height H1, while a second type of catalyst 310b or another inert material or weighting material is provided above to at least the height H2.

Moreover, the sulfur inlet zone 182a is defined between the sulfur inlet control assembly 140a and a corresponding portion of the containment element 120, such that the sulfur inlet flow control assembly 140a is positioned between the catalyst zone 190 and the sulfur inlet zone 182a, as illustrated by FIGS. 3 and 4A. The sulfur outlet zone 182b is defined between the sulfur outlet control assembly 140b and a corresponding portion of the containment element 120, such that the sulfur outlet control assembly 140b is positioned between the catalyst zone 190 and the sulfur outlet zone 182b. The gas inlet zone 184a is defined between the sparge assembly 130 and a corresponding portion of the containment element 120, such that the sparge assembly 130 is positioned between the catalyst zone 190 and the gas inlet zone 184a. The gas outlet zone 184b is defined between a top portion of the catalyst zone 190 and a corresponding portion of the containment element 120. In some embodiments, the sulfur inlet and outlet zones (182a, 182b), the gas inlet and outlet zones (184a, 184b), and the catalyst zone 190, together, define the housing volume Vc.

Similarly, now referring to FIG. 4B illustrating the contactor apparatus 20, the sulfur inlet zone 282a is defined between the sulfur inlet control assembly 240a and a corresponding portion of the containment element 220, such that the sulfur inlet flow control assembly 240a is positioned between the catalyst zone 290 and the sulfur inlet zone 282a. The sulfur outlet zone 282b is defined between the sulfur outlet control assembly 240b and a corresponding portion of the containment element 220, such that the sulfur outlet control assembly 240b is positioned between the catalyst zone 290 and the sulfur outlet zone 282b. The gas inlet zone 284a is defined between the sparge assembly 230 and a corresponding portion of the containment element 220, such that the sparge assembly 230 is positioned between the catalyst zone 290 and the gas inlet zone 284a. The gas outlet zone 284b is defined between a top portion of the catalyst zone 290 and a corresponding portion of the containment element 220. As illustrated, a flow of liquid sulfur through the sulfur inlet flow control assembly 240a (from the sulfur inlet zone 282a), onto the catalyst zone 290, and thence into the sulfur outlet zone 282b via the sulfur outlet control assembly 240b, is in a generally horizontal direction (Sa, Sb). As illustrated, a flow of degassing gas from the gas inlet zone 284a, through the sparge assembly 230, onto the catalyst zone 290, and thence onto the gas outlet zone 284b, is in a generally vertical direction (Va, Vb), perpendicular to the liquid sulfur flow direction (Sa, Sb).

In accordance with some embodiments, the sulfur degassing process 600 of the contactor apparatus 10 typically comprises the following steps which may be performed in tandem or in a suitable order. Although the sulfur degassing process 600 is described with respect to the container apparatus 10, it is understood that the sulfur degassing process 600 is also applicable to the container apparatus 20 and its corresponding parts. As illustrated by block 610 of FIG. 6, liquid sulfur to be degassed is received at (or injected/provided at) the sulfur inlet port 152a. It should be understood that in some embodiments there may be multiple inlet ports. In some embodiments, the sulfur inlet port 152a comprises a metering valve and/or a nozzle. In some embodiments, liquid sulfur may be received or retrieved from one or more liquid sulfur discharge conduits of a sulfur recovery unit (e.g., a Claus Sulfur Recovery Plant) that are downstream of one or more sulfur condensers, and/or from one or more degassing vessels of the sulfur recovery unit. The sulfur inlet port 152a directs and conveys the received liquid sulfur into the sulfur inlet zone 182a at a predetermined incline or angle. The sulfur inlet zone 182a is structured such that, the liquid sulfur flows into and occupies the sulfur inlet zone 182a both transversely along the width of the sulfur inlet zone 182a and longitudinally along the length of the sulfur inlet zone 182a. The sulfur inlet zone 182a is structured such that the sulfur inlet zone reduces or regulates the velocity of the liquid sulfur to a predetermined range (e.g., about 0.2-0.25 feet per second (fps), 0.1-0.3 fps, 0.1-0.5 fps, and/or above, in-between, overlapping, or falling outside of these ranges), to cause a fluid pressure of the liquid sulfur within the sulfur inlet zone 182a to be equalized or substantially equalized. In other words, the sulfur inlet zone 182a is structured such that the pressure of the liquid sulfur is equalized or substantially equalized throughout the sulfur inlet zone 182a (longitudinally, transversely and/or along the height), such that a pressure of liquid sulfur within the sulfur inlet zone 182a proximate the sulfur inlet port 152a is same or similar to that of liquid sulfur within the sulfur inlet zone 182a proximate the planar component 118a (pressure equalization longitudinally). The pressure equalization may be performed such that a pressure of liquid sulfur within the sulfur inlet zone 182a proximate the sulfur inlet port 152a is same or similar to that of liquid sulfur proximate an upper level/fluid surface of the liquid sulfur (pressure equalization along the height), and/or is same or similar to that of liquid sulfur proximate the sulfur inlet control assembly 140a (pressure equalization transversely). In some embodiments, the volume flow rate and mass flow rate may also be equalized. This equalization of pressure and/or regulation of velocity of the liquid sulfur within the sulfur inlet zone 182a, causes the liquid sulfur to flow through the sulfur inlet flow control assembly 140a uniformly in the horizontal direction Sa (e.g., in parallel streams each having similar or substantially similar fluid velocities, volume flow rates, mass flow rates, and/or the like) as illustrated by block 620 in FIG. 6. For example, a stream of liquid sulfur flowing through the sulfur inlet control assembly 140a in the general horizontal direction Sa proximate the sulfur inlet port 152a, may comprise fluid flow characteristics that are similar or substantially similar to that of a parallel stream of liquid sulfur flowing through the sulfur inlet flow control assembly 140a in the general horizontal direction Sa proximate the planar component 118b.

Block 630 of FIG. 6 illustrates that the liquid sulfur flows through, uniformly or substantially uniformly, the catalyst zone 190. The catalyst pellets 310 in the catalyst zone 190 convert $H_2S_x$ (gas) in the liquid sulfur to $H_2S$ and elemental sulfur. Reducing the content of $H_2S_x$ at this stage of the production of liquid sulfur has been found to substantially reduce the tendency of stored liquid sulfur to slowly yield $H_2S$ gas (e.g., in the sulfur pit, storage tank, or the like). In some embodiments, $H_2S$ and $H_2S_x$ in the liquid sulfur after degassing is less than or equal to 10 parts per million.

The productivity of the catalyst pellets 310 in the catalyst zone 190 is enhanced by agitation, especially by a degassing gas. The degassing gas used to stir the liquid sulfur in the catalyst zone 190 may comprise at least one of or a combination of: a process gas from the Claus process (e.g., a $H_2S$ containing gas), inert gases such as Nitrogen, air, reducing gases, and/or the like. As illustrated by block 640 of FIG. 6, degassing gas may be retrieved by or received by the gas inlet port 154a.

As described above, a flow of degassing gas (which can be vapor in some embodiments) from the gas inlet zone 184a, via the sparge assembly 130 and through the catalyst zone 190, for agitating the catalyst pellets 310 and enhancing the contact between the horizontal flow of liquid sulfur and the catalyst pellets 310, is in a generally upward or vertical direction Va. In order to prevent downward flow of any remnants of liquid sulfur or degassing gas from the catalyst zone 190 into the gas inlet port 154a (e.g., when the degassing gas is not being supplied there-through), the gas inlet port 154a is positioned at a height above the sparge assembly 130 and above the gas inlet zone 184a (as illustrated by FIG. 3). However, in order to convey the degassing gas from the gas inlet port 154a to the gas inlet zone 184a typically positioned below the sparge assembly 130, the contactor apparatus 10 may further comprise an intermediate gas inlet manifold 154c structured for conveying degassing gas received at the gas inlet port 154a into the gas inlet zone 184a. The intermediate gas inlet manifold 154c is fluidically connected to the gas inlet port 154a and to the gas inlet port 154a. As discussed, the intermediate gas inlet manifold 154c may comprise at least a portion of the second end volume Eb between the planar component 118b and the corresponding end cover component 119b and/or the first end volume Ea between the planar component 118a and the corresponding end cover component 119a. The gas inlet port 154a and/or the intermediate gas inlet manifold 154c may comprise a metering valve and/or a nozzle.

Similar, to the sulfur inlet zone 182a, the gas inlet zone 184a is structured for equalizing the flow characteristics of the degassing gas. The gas inlet zone 184a is structured such that, the degassing gas flows into and occupies the gas inlet zone 184a both transversely along the width of the gas inlet zone 184a and longitudinally along the length of the gas inlet zone 184a. The gas inlet zone 184a is structured such that the gas inlet zone 184a reduces or regulates the velocity of the degassing gas, to cause a fluid pressure of the degassing gas within the gas inlet zone 184a to be equalized or substantially equalized. In other words, the gas inlet zone 184a is structured such that the pressure of the degassing gas is equalized or substantially equalized throughout the gas inlet zone 184a (longitudinally, transversely and/or along the height). This equalization of pressure and/or regulation of velocity of the degassing gas within the gas inlet zone 184a, causes the degassing gas to flow through the sparge assembly 130 (e.g., through the plurality of apertures in the one or more sparge plates 132) uniformly in the generally upward vertical direction Va (e.g., in parallel streams each having similar or substantially similar fluid velocities, volume flow rates, mass flow rates, and/or the like) as illustrated in block 650 of FIG. 6. As previously discussed with respect to block 630 in FIG. 6, the degassing gas provides additional agitation for degassing the liquid sulfur in the catalyst zone 190.

After the degassing process, as illustrated in block 660 of FIG. 6, the liquid sulfur from the catalyst zone 190 flows through the sulfur outlet control assembly 140b and into the sulfur outlet zone 182b, in a generally horizontal direction Sb (similar to or parallel to Sa). The operation here may be the reverse of that described with respect to the sulfur inlet zone 182a. The degassed liquid sulfur may collect in the sulfur outlet zone 182b, from where the degassed liquid sulfur may be retrieved via the sulfur outlet port 152b, e.g., for storage or transport. As illustrated in block 670 of FIG. 6, after the degassing gas (and hydrogen sulfide gas from the degassed liquid sulfur) passes through the catalyst zone 190 in the generally upward vertical direction Vb (similar to or parallel to Va), the degassing gas (and hydrogen sulfide) collects at the gas outlet zone 184*b* above the catalyst zone 190, from where it may be retrieved for treatment or expulsion via the gas outlet port 154*b*. As such the sulfur outlet port 152*b* and/or the gas outlet port 154*b* may each comprise metering valve and/or a nozzle. In some embodiments, the gas outlet zone 184*b* is structured to provide a predetermined low gas velocity to the degassing gas exiting the catalyst zone 190, such that any liquid droplets in the degassing gas at the gas outlet zone flow separate from the degassing gas and flow downwards/drop into the catalyst zone 190 (and/or into the sulfur inlet zone 182*a* and/or the sulfur outlet zone 182*b*), which would be otherwise carried out of the housing 110 due to a higher flow velocity of the degassing gas exiting the catalyst zone 190. In some embodiments, the gas outlet zone 184*b* further comprises a demister pad located proximate the degassing gas outlet port 154*b*. The demister pad is structured to capture any entrained liquid droplets in the degassing gas existing the gas outlet zone 184*b* and/or the gas outlet port 154*b*.

The foregoing steps may be repeated in some embodiments. In some embodiments, a plurality of contactor apparatuses, or a plurality of degassing assemblies with catalyst zones within the housing, may be employed in parallel for sequential degassing of the liquid sulfur.

The features of the gas inlet zone 184*a*, in accordance with some embodiments, are described in detail with respect to FIGS. 5A and 5B below. FIG. 5A illustrates a schematic cut-away view 500A of the contactor apparatus 10 of FIG. 1A, when degassing gas is not being injected. FIG. 5B illustrates a schematic cut-away view 500B of the contactor apparatus of FIG. 1A, when degassing gas is being or has been injected. As illustrated by FIGS. 5A and 5B, the housing 110 comprises a sump assembly 128 at the gas inlet zone 184*a*. The sump assembly 128 may further comprise a dip tube 129. The sump assembly may be a component, such as a container, that is located within the housing 110 or outside of the housing 110 (e.g., a secondary housing) and is operatively coupled to the housing 110. Alternatively, the sump assembly may be integral within the housing 110 (e.g., containment element 120 of the housing, or the like). Regardless of the configuration, the sump assembly 128 may provide a cavity in which liquid sulfur may be captured when the degassing gas is not flowing, as described in further detail below.

As illustrated by FIG. 5A, when degassing gas is not being injected or when a flow of the degassing gas is stopped, liquid sulfur from the catalyst zone 190 may flow into the gas inlet zone 184*a* below, through the sparge assembly 130 and also into the sump assembly 128. However, when the degassing gas is injected at the gas inlet port 154*a* or the flow of the degassing gas is resumed, the degassing gas is conveyed to the gas inlet zone 184*a*, via the intermediate gas inlet manifold 154*c*. As illustrated by FIG. 5B, when the degassing gas is provided at the gas inlet zone 184*a*, the degassing gas moves into the gas inlet zone 184*a* underneath the sparge assembly 130, and moves (e.g., forces, pushes or displaces) the liquid sulfur from the gas inlet zone 184*a*, into the catalyst zone, via the sump assembly 128 and/or dip tube 129. The degassing gas also flows through the sparge assembly 130 as described previously and into the catalyst zone 190, as indicated by degassing gas bubbles/flow 312. In some embodiments, a dynamic pressure drop occurs across the sparge assembly 130 resulting from the degassing gas movement through the plurality of sparge apertures in the sparge plates 132. This pressure drop causes the operating pressure of the gas inlet zone 184*a* to be higher than the operating pressure of the catalyst zone 190. In other words, the operating pressure of the gas inlet zone 184*a* (e.g., a higher pressure than the catalyst zone 190) and the operating pressure of the catalyst zone 190 exhibit a pressure differential $\Delta P$ across the sparge assembly 130. The pressure differential $\Delta P$ pushes the liquid sulfur out of the gas inlet zone 184*a* and into the catalyst zone 190 (e.g., via the dip tube 129 or via the sparge apertures). The resulting liquid level in the sump assembly 128 is such that the differential head $\Delta H$ of the liquid sulfur in the dip tube 129 is equal to the pressure differential $\Delta P$.

In some embodiments, the features and functions of the gas inlet zone 284*a* and the sump assembly 228 of the container apparatus 20 are substantially similar to those of the gas inlet zone 184*a* and the sump assembly 128 of the container apparatus 10, described above with respect to FIGS. 5A-5B.

It should be understood that the sulfur inlet and outlet ports (152*a*, 152*b*), the gas inlet and outlet ports (154*a*, 154*b*), the sulfur inlet and outlet control assemblies (140*a*, 140*b*), the sparge assembly 130, etc. may be located on any suitable location and surface of the housing 110 and operate in the various ways described herein. Moreover, portions of various embodiments of the invention described herein may be combined with other portions of different embodiments of the invention described herein, to form other embodiments of the present that are not specifically disclosed in a single illustrated embodiment, but instead make up one or more combinations of the various embodiments described herein.

The present invention is described herein as being utilized within a refinery, and particularly for use with sulfur recovery systems (also described as sulfur recovery units) within a refinery. It should be understood that in other embodiments of the invention the degasser contactor apparatus 10 may be utilized in other systems that require degassing and/or the mixing of liquid and vapor streams in the presence of a catalyst.

It should be understood that when the term generally is used herein to describe the orientations of horizontally, vertically, parallel, perpendicular, or the like, the term means that the orientations may be +/−1, 2, 3, 4, 4, 5, 10, 15, 20, 25, 30 degrees, or the like, or any range that falls within, overlaps, or is outside of these degrees. While when the term approximately is used instead of generally, the orientation may be +/−1, 2, 3, 4, 5, or the like or any range that falls within or overlaps these degrees.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and should not be interpreted in an idealized or overly formal sense unless expressly so defined herein. Certain terminology is used herein for convenience only and is not to be taken as a limitation on the invention. For example, words such as "upper," "lower," "left," "right," "horizontal," "vertical," "upward," "downward," or the like merely describe the configurations shown in the figures. The referenced components may be oriented in an orientation other than that shown in the drawings and the terminology, therefore, should be understood as encompassing such variations unless specified otherwise.

It should be understood that the components herein may be operatively coupled together. Moreover, it should be understood that "operatively coupled," when used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together.

In addition, where possible, any terms expressed in the singular form herein are meant to also include the plural form and/or vice versa, unless explicitly stated otherwise. Accordingly, the terms "a" and/or "an" shall mean "one or more."

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A contactor apparatus for degassing liquid sulfur, the apparatus comprising:
    a housing comprising a liquid sulfur inlet, a liquid sulfur outlet, a degassing gas inlet, and a degassing gas outlet;
    a degassing assembly located within the housing, the degassing assembly comprising:
        a sparge assembly operatively coupled to the degassing gas inlet; and
        a sulfur control assembly comprising:
            a sulfur inlet control assembly operatively coupled to the liquid sulfur inlet, wherein a portion of the housing and the sulfur inlet control assembly form a sulfur inlet zone; and
            a sulfur outlet control assembly operatively coupled to the liquid sulfur outlet; and
        wherein the sparge assembly and the sulfur control assembly form a catalyst zone for degassing the liquid sulfur;
    wherein the liquid sulfur received at the liquid sulfur inlet is passed through the sulfur inlet zone and the sulfur inlet control assembly, and passed into the catalyst zone in a generally horizontal direction, and the liquid sulfur exits the catalyst zone through the sulfur outlet control assembly and exits the housing at the liquid sulfur outlet; and
    wherein the housing receives degassing gas at the degassing gas inlet, the degassing gas is passed through the catalyst zone in a generally vertical direction, and the degassing gas exits the housing at the degassing gas outlet.

2. The apparatus of claim 1:
    wherein the sulfur inlet zone that is configured to produce a uniform liquid sulfur distribution across the sulfur control assembly;
    wherein the sulfur outlet control assembly and a portion of the housing form a sulfur outlet zone that is configured to produce the uniform liquid sulfur distribution across the sulfur control assembly;
    wherein the sparge assembly and a portion of the housing form a gas inlet zone located below the sparge assembly, wherein the degassing gas from the degassing gas inlet is passed through the gas inlet zone, through the sparge assembly and into the catalyst zone; and
    wherein the gas inlet zone is configured to produce a uniform degassing gas pressure distribution across the sparge assembly.

3. The apparatus of claim 1, wherein the sulfur inlet control assembly and the sulfur outlet control assembly each comprise one or more screens that permit flow of the liquid sulfur and restrict a catalyst to the catalyst zone, wherein the sparge assembly comprises one or more sparge plates with a plurality of sparge apertures that permit flow of the degassing gas and restrict the catalyst to the catalyst zone.

4. The apparatus of claim 3, wherein the one or more screens are removable from the housing for servicing, and wherein the one or more sparge plates are removable from the housing for servicing.

5. The apparatus of claim 1, wherein the catalyst zone comprises:
    a first catalyst portion proximate the sparge assembly comprising a first catalyst material; and
    a second catalyst portion located above the first catalyst portion comprising a second material, wherein the second catalyst portion is structured such that a downward weight exerted by the second catalyst portion on the first catalyst portion is configured to constrain motion of the first catalyst portion, and wherein the second material comprises at least one of the first catalyst material, a second catalyst material, or an inert material.

6. The apparatus of claim 1, wherein the catalyst zone comprises:
    a first catalyst portion proximate the sparge assembly comprising a first catalyst material; and
    a second catalyst portion located above the first catalyst portion comprising a second material, wherein the second catalyst portion is configured to replenish the first catalyst portion upon attrition of the first catalyst material, and wherein the second material comprises at least one of the first catalyst material, or a second catalyst material.

7. The apparatus of claim 1, wherein a catalyst and a portion of the housing form a gas outlet zone located above the catalyst in the catalyst zone, and wherein the gas outlet zone is structured to provide a predetermined low gas velocity to the degassing gas such that liquid droplets in the gas outlet zone flow separate from the degassing gas and flow downwards into the catalyst zone.

8. The apparatus of claim 1, wherein the catalyst zone and a portion of the housing form a gas outlet zone located above a catalyst in the catalyst zone, and wherein the gas outlet zone comprises a demister pad located proximate the degassing gas outlet structured to capture entrained liquid droplets in the degassing gas.

9. The apparatus of claim 1, wherein the degassing gas inlet is located above the liquid sulfur inlet and above the sparge assembly positioned below the catalyst zone, wherein the degassing gas received at the degassing gas inlet passes downwardly into a gas inlet zone below the sparge assembly and upwardly through the sparge assembly and the catalyst zone.

10. The apparatus of claim 1, further comprising:
a sump assembly operatively coupled within the housing below the sparge assembly; and
a dip tube operatively coupled to the catalyst zone;
wherein at least one of the sump assembly and a gas inlet zone collect the liquid sulfur when the degassing gas is shut off; and
wherein the dip tube delivers the liquid sulfur from the sump assembly to the catalyst zone when the degassing gas is turned on.

11. A method for degassing liquid sulfur using a contactor apparatus, the method comprising:
receiving the liquid sulfur within a housing through a liquid sulfur inlet;
receiving a degassing gas within the housing through a degassing gas inlet;
permitting the liquid sulfur to flow through a degassing assembly in a generally horizontal direction, and permitting the degassing gas to flow through the degassing assembly in a generally vertical direction, wherein the degassing assembly comprises:
a sparge assembly operatively coupled to the degassing gas inlet; and
a sulfur control assembly comprising:
a sulfur inlet control assembly operatively coupled to the liquid sulfur inlet, wherein a portion of the housing and the sulfur inlet control assembly form a sulfur inlet zone; and
a sulfur outlet control assembly operatively coupled to a liquid sulfur outlet; and
wherein the sparge assembly and the sulfur control assembly form a catalyst zone for degassing the liquid sulfur;
wherein the liquid sulfur received at the liquid sulfur inlet is passed through the sulfur inlet zone and the sulfur inlet control assembly and into the catalyst zone;
permitting the liquid sulfur to flow out of the catalyst zone through the sulfur outlet control assembly and exit the housing through the liquid sulfur outlet after degassing in the catalyst zone; and
permitting the degassing gas and gaseous hydrogen sulfide that was degassed from the liquid sulfur to flow out the housing through a degassing gas outlet after exiting the catalyst zone.

12. The method of claim 11:
wherein the sulfur inlet zone that is configured to produce a uniform liquid sulfur distribution across the sulfur control assembly;
wherein the sulfur outlet control assembly and a portion of the housing form a sulfur outlet zone that is configured to produce the uniform liquid sulfur pressure distribution across the sulfur control assembly;
wherein the sparge assembly and a portion of the housing form a gas inlet zone located below the sparge assembly, wherein the degassing gas from the degassing gas inlet is passed through the gas inlet zone, through the sparge assembly and into the catalyst zone; and
wherein the gas inlet zone is configured to produce a uniform degassing gas distribution across the sparge assembly.

13. The method of claim 11, wherein the sulfur inlet control assembly and the sulfur outlet control assembly each comprise one or more screens that permit flow of the liquid sulfur and restrict a catalyst to the catalyst zone, wherein the sparge assembly comprises one or more sparge plates with a plurality of sparge apertures that permit flow of the degassing gas and restrict the catalyst to the catalyst zone.

14. The method of claim 11, wherein the catalyst zone comprises:
a first catalyst portion proximate the sparge assembly comprising a first catalyst material; and
a second catalyst portion located above the first catalyst portion comprising a second material, wherein the second catalyst portion is structured such that a downward weight exerted by the second catalyst portion on the first catalyst portion is configured to constrain motion of the first catalyst portion, and wherein the second material comprises at least one of the first catalyst material, a second catalyst material, or an inert material.

15. The method of claim 11, wherein the catalyst zone comprises:
a first catalyst portion proximate the sparge assembly comprising a first catalyst material; and
a second catalyst portion located above the first catalyst portion comprising a second material, wherein the second catalyst portion is configured to replenish the first catalyst portion upon attrition of the first catalyst material, and wherein the second material comprises at least one of the first catalyst material, or a second catalyst material.

16. The method of claim 11, wherein the catalyst zone and a portion of the housing form a gas outlet zone located above a catalyst in the catalyst zone, and wherein the gas outlet zone is structured to provide a predetermined low gas velocity to the degassing gas such that liquid droplets in the gas outlet zone flow separate from the degassing gas and flow downwards into the catalyst zone.

17. The method of claim 11, wherein a catalyst and a portion of the housing form a gas outlet zone located above the catalyst in the catalyst zone, and wherein the gas outlet zone comprises a demister pad located proximate the degassing gas outlet structured to capture entrained liquid droplets in the degassing gas.

18. The method of claim 11, further comprising:
collecting the liquid sulfur in at least one of a sump assembly and a gas inlet zone when the degassing gas is shut off, wherein the sump assembly is operatively coupled within the housing below the sparge assembly; and
delivering the liquid sulfur from the sump assembly to the catalyst zone through a dip tube when the degassing gas is turned on, wherein the dip tube is operatively coupled to the catalyst zone.

19. A contactor apparatus for degassing liquid sulfur, the apparatus comprising:
a housing comprising a liquid sulfur inlet, a liquid sulfur outlet, a degassing gas inlet, and a degassing gas outlet;
a degassing assembly located within the housing, the degassing assembly comprising:
a sparge assembly operatively coupled to the degassing gas inlet; and
a sulfur control assembly comprising:
a sulfur inlet control assembly operatively coupled to the liquid sulfur inlet; and
a sulfur outlet control assembly operatively coupled to the liquid sulfur outlet; and wherein the sparge assembly and the sulfur control assembly form a catalyst zone for degassing the liquid sulfur;

wherein the liquid sulfur received at the liquid sulfur inlet is passed through the sulfur inlet control assembly on a side of the catalyst zone and passed into the catalyst zone in a generally horizontal direction, and the liquid sulfur exits the catalyst zone through the sulfur outlet control assembly and exits the housing at the liquid sulfur outlet; and wherein the housing receives degassing gas at the degassing gas inlet, the degassing gas is passed through the catalyst zone in a generally vertical direction, and the degassing gas exits the housing at the degassing gas outlet.

20. The apparatus of claim 19, wherein a portion of the housing and the sulfur inlet control assembly form a sulfur inlet zone, and wherein the liquid sulfur received at the liquid sulfur inlet is passed through the sulfur inlet zone and the sulfur inlet control assembly.

* * * * *